US005850388A

United States Patent [19]
Anderson et al.

[11] Patent Number: 5,850,388
[45] Date of Patent: Dec. 15, 1998

[54] PROTOCOL ANALYZER FOR MONITORING DIGITAL TRANSMISSION NETWORKS

[75] Inventors: Craig D. Anderson, Durham; Mark B. Anderson, Chapel Hill; Eugene N. Cookmeyer, Apex; Ralph A. Daniels, Clayton; Lee E. Wheat, Durham; Roger A. Lingle, Raleigh, all of N.C.

[73] Assignee: Wandel & Goltermann Technologies, Inc.

[21] Appl. No.: 742,093

[22] Filed: Oct. 31, 1996

Related U.S. Application Data

[60] Provisional application No. 60/023,459, Aug. 2, 1996.
[51] Int. Cl.$^6$ ...................................................... H04L 12/26
[52] U.S. Cl. ...................... 370/252; 371/20.1; 395/183.15
[58] Field of Search ........................................ 370/241, 252, 370/253; 371/20.1; 395/183.15, 200.94

[56] References Cited

U.S. PATENT DOCUMENTS

| | | | |
|---|---|---|---|
| 4,437,184 | 3/1984 | Cork et al. ................................. | 371/19 |
| 4,550,407 | 10/1985 | Couasnon et al. ........................ | 371/29 |
| 4,672,611 | 6/1987 | Fukuhara et al. ......................... | 371/59 |
| 4,680,755 | 7/1987 | Reames ..................................... | 370/85 |
| 4,775,973 | 10/1988 | Tomberlin et al. ....................... | 370/60 |
| 4,792,753 | 12/1988 | Iwai .......................................... | 324/73 |
| 4,887,260 | 12/1989 | Carden et al. ............................ | 370/60 |
| 4,916,694 | 4/1990 | Roth ......................................... | 370/94 |
| 5,040,111 | 8/1991 | Al-Salameth et al. ................... | 364/200 |
| 5,090,014 | 2/1992 | Polich et al. ............................. | 371/15.1 |
| 5,097,469 | 3/1992 | Douglas ................................... | 371/20.1 |
| 5,187,708 | 2/1993 | Nakatani et al. ......................... | 370/85.1 |
| 5,197,127 | 3/1993 | Waclawski et al. ...................... | 395/200 |
| 5,260,970 | 11/1993 | Henry et al. ............................. | 375/10 |
| 5,276,529 | 1/1994 | Williams .................................. | 358/406 |
| 5,276,802 | 1/1994 | Yamaguchi et al. ..................... | 395/164 |
| 5,278,836 | 1/1994 | Iimura et al. ............................ | 370/112 |
| 5,282,194 | 1/1994 | Harley, Jr. et al. ...................... | 370/17 |
| 5,287,506 | 2/1994 | Whiteside ................................ | 395/650 |
| 5,293,384 | 3/1994 | Keeley et al. ............................ | 371/16.3 |
| 5,303,344 | 4/1994 | Yokoyama et al. ...................... | 395/200 |
| 5,309,507 | 5/1994 | Hosaka et al. ............................ | 379/96 |
| 5,317,725 | 5/1994 | Smith et al. .............................. | 395/575 |
| 5,317,742 | 5/1994 | Bapat ........................................ | 395/700 |
| 5,325,528 | 6/1994 | Klein ........................................ | 395/650 |
| 5,333,302 | 7/1994 | Hensley et al. .......................... | 395/575 |
| 5,345,396 | 9/1994 | Yamaguchi ............................... | 395/500 |
| 5,347,524 | 9/1994 | I'Anson ................................... | 371/29.1 |
| 5,373,346 | 12/1994 | Hocker ..................................... | 364/550 |
| 5,375,126 | 12/1994 | Wallace .................................... | 371/20.1 |
| 5,375,159 | 12/1994 | Williams .................................. | 379/23 |
| 5,377,196 | 12/1994 | Godlew et al. .......................... | 371/20.1 |
| 5,418,972 | 5/1995 | Takeuchi et al. ........................ | 395/800 |

(List continued on next page.)

OTHER PUBLICATIONS

Uyless Black, "OSI: A Model for Computer Communications Standards", Prentice–Hall, Inc., pp. 8–11 and 54–56, 1991.

Weaver, Alfred C. and McNabb, James F., "A Real–Time Monitor for Token Ring Networks," MILCOM '89: Bridging the Gap, pp. 794–798, 1989.

Brochure, Network General Corporation, Products and Services, dated May, 1995, face, back page, and pp. 1–10.

*Primary Examiner*—Melvin Marcelo
*Attorney, Agent, or Firm*—Moore & Van Allen, PLLC; William G. Dosse

[57] ABSTRACT

A new and improved protocol analyzer for monitoring digital transmission networks is disclosed. The protocol analyzer of the present invention is capable of displaying station level statistics, network statistics, real-time event information, and protocol distribution. The protocol analyzer of the present invention is additionally capable of creating baseline network performance information and displaying the baseline information simultaneously with real-time performance information, pre-programming monitoring sessions, and generating presentation-quality reports in conjunction with analyzing digital transmission networks, all in real time.

1 Claim, 18 Drawing Sheets

U.S. PATENT DOCUMENTS

| | | | |
|---|---|---|---|
| 5,434,845 | 7/1995 | Miller | 370/13 |
| 5,440,719 | 8/1995 | Hanes et al. | 395/500 |
| 5,442,737 | 8/1995 | Smith | 395/135 |
| 5,442,741 | 8/1995 | Hughes et al. | 395/142 |
| 5,444,706 | 8/1995 | Osaki | 370/94.1 |
| 5,446,874 | 8/1995 | Waclawski et al. | 395/575 |
| 5,457,729 | 10/1995 | Hamann et al. | 379/2 |
| 5,469,463 | 11/1995 | Polich et al. | 395/182.18 |
| 5,473,551 | 12/1995 | Sato et al. | 364/496 |
| 5,475,732 | 12/1995 | Pester, III | 379/34 |
| 5,477,531 | 12/1995 | McKee et al. | 370/17 |
| 5,481,548 | 1/1996 | Wallace | 371/20.1 |
| 5,490,199 | 2/1996 | Fuller et al. | 379/1 |
| 5,504,736 | 4/1996 | Cubbison, Jr. | 370/13 |
| 5,701,400 | 12/1997 | Amado | 395/76 |

OTHER PUBLICATIONS

Distributed Sniffer System, "Seven–Layer Analysis on all Segments Quickly Pinpoints Problems And Recommends Solutions", Network General Corporation, dated May, 1996, 6 pages.

Sniffer Network Analyzer, "Seven–Layer Analysis on all Segments Quickly Pinpoints Problems And Recommends Solutions", Network General Corporation, dated Jul. 1996, 6 pages.

Product Brochure, DominoLAN™ Internetwork Analyzer, DA–320, Wandel & Goltermann, 6 pages.

User Guide, Link View™ 1000 Network Analyzer, Tinwald Networking Technologies Inc., dated Jan. 1, 1996.

| LAYER 7 - APPLICATION LAYER |
| --- |
| LAYER 6 - PRESENTATION LAYER |
| LAYER 5 - SESSION LAYER |
| LAYER 4 - TRANSPORT LAYER |
| LAYER 3 - NETWORK LAYER |
| LAYER 2 - DATA LINK LAYER |
| LAYER 1 - PHYSICAL LAYER |

| | Analyzer | Date / Time | | Event |
|---|---|---|---|---|
| 5 | Domino 1 | 04/22/96 | 13:27:29 | IP address 0.0.0.0 is being used by both MAC station 00 00 00 00 and MAC station 00 00 81 11 77. |
| 6 | Domino 1 | 04/22/96 | 13:27:29 | An IP broadcast address of 0.0.0.0 is being used as a source address. |
| 7 | Domino 1 | 04/22/96 | 13:27:28 | 126 multicast frames have been detected. This exceeds the configured threshold. |
| 8 | Domino 1 | 04/22/96 | 13:27:29 | 121 broadcast frames have been detected. This exceeds the configured threshold. |
| 9 | Domino 1 | 04/22/96 | 13:27:27 | Event Logging Started |
| 10 | Domino 1 | 04/22/96 | 07:21:52 | Station 198.85.38.1 has sent one or more ICMP "port unreachable messages. The last notification of this was sent to station 198.85.34.113 and indicated that port 138 was unreachable. |
| 11 | Domino 1 | 04/22/96 | 07:21:36 | IP address 0.0.0.0 is being used by both MAC station 00 00 00 00 and MAC station 00 00 81 11 77. |
| 12 | Domino 1 | 04/22/96 | 07:21:36 | An IP broadcast address of 0.0.0.0 is being used as a source address. |

FIG. 21

PROTOCOL ANALYZER FOR MONITORING DIGITAL TRANSMISSION NETWORKS

This application claims priority to provisional application number 60/023,459, filed Aug. 2, 1996.

FIELD OF THE INVENTION

The present invention relates generally to the field of computer and data communications networks and systems and more particularly to protocol analyzers for monitoring and analyzing digital transmission networks.

BACKGROUND OF THE INVENTION

Wide area computer networks ("WANs") first emerged in the 1970's to enable computers to communicate across broad geographic areas. Distributed computing resources, such as personal computers, workstations, servers and printers, have proliferated in recent years due to the declining cost and increasing performance of computer hardware. This has been a key factor in the growth of local area network technology. Local area networks ("LANs") allow increased productivity and utilization of distributed computers or stations through the sharing of resources, the transfer of information and the processing of data at the most efficient locations. As organizations have recognized the economic benefits of using LANs, network applications such as electronic mail, file transfer, host access and shared databases have been developed as means to increase user productivity. This increased sophistication, together with the growing number of distributed computing resources, has resulted in a rapid expansion in the number of installed LANs.

As the demand for LANs has grown, LAN technology has expanded and now includes many different physical connection configurations ("network topologies" or "networks"), such as Ethernet, a LAN that employs a bus topology where the computing resources are connected to a single cable; Token Ring, a LAN that employs a ring topology where the computing resources are connected to a single closed loop cable; and Fiber Distributed Data Interface ("FDDI"), a LAN that supports fiber optic cables where the computing resources are connected in a series of dual rings. These and the many other types of networks that have appeared typically have several different cabling systems, utilize different bandwidths and transmit data at different speeds. In addition, hardware and software systems for LANs usually have different sets of rules and standards ("protocols") which define the method of access to the network and communication among the resources on the network, such as Novell NetWare, IBM NetBIOS, DECNet, AppleTalk and Banyan Vines. More recently, large users of LANs have increasingly sought to integrate local area networks with WANs, and this trend is expected to intensify as inter-network technology advances so as to permit more rapid delivery of advanced multimedia communications utilizing Asynchronous Transfer Mode ("ATM"), an advanced high-speed switching protocol, and other broadband transmission technologies.

Digital data are usually transmitted over a network in frames (also referred to as "data frames" or "packets") which can be of fixed or variable length depending upon the number of bits in the data portion of the frame. Frames usually have headers (e.g., addresses) and footers on the two ends of the frame, with the conveyed data bits being in the middle. These headers and footers are also sometimes referred to as "protocols." The structure of a frame is discussed in more detail below in the section entitled Frame Analysis. The nature and content of the headers and footers are usually dictated by the type of network.

Transmissions from one network computer to another must be passed through a hierarchy of protocol layers. Each layer in one network computer carries on a conversation with the corresponding layer in another computer with which communication is taking place, in accordance with a protocol defining the rules of communication. In reality, information is transferred down from layer to layer in one computer, then through the communication channel medium and back up the successive layers in the other computer. To facilitate understanding, however, it is easier to consider each of the layers as communicating with its counterpart at the same level, in a horizontal direction.

The hierarchy of network layers is illustrated in FIG. 1. The highest network layer is the Application Layer 7. It is the level through which user applications access network services. The Presentation Layer 6 translates data from the Application Layer 7 into an intermediate format and provides data encryption and compression services. The Session Layer 5 allows two applications on different computers to communicate by establishing a dialog control between the two computers that regulates which side transmits, when each side transmits, and for how long. The Transport Layer 4 is responsible for error recognition and recovery, repackaging of long messages into small packages of information, and providing an acknowledgment of receipt. The Network Layer 3 addresses messages, determines the route along the network from the source to the destination computer, and manages traffic problems, such as switching, routing, and controlling the congestion of data transmissions. The Data Link Layer 2 packages raw bits into logical structured packets or frames. It then sends the frame from one computer to another. If the destination computer does not send an acknowledgment of receipt, the Data Link Layer 2 will resend the frame. The Physical Layer 1 is responsible for transmitting bits from one computer to another by regulating the transmission of a stream of bits over a physical medium. This layer defines how the cable is attached to the network interface card within the station computer and what transmission technique is used to send data over the cable. As a message is passed down through the layers, each layer may or may not add protocol information to the message.

As LANs and WANs have increased in number and complexity, networks have become more likely to develop problems which, in turn, have become more difficult to diagnose and solve. Network performance can suffer due to a variety of causes, such as the transmission of unnecessarily small frames of information, inefficient or incorrect routing of information, improper network configurations and superfluous network traffic. Specific network hardware and software systems may also contain design flaws which affect network performance or limit access by users to certain of the resources on the network. These problems are compounded by the fact that most local and wide area networks are continually changing and evolving due to growth, reconfiguration and the introduction of new network topologies, protocols, interconnection devices and software applications.

Increasing numbers of organizations use local and wide area networks, and the accurate and timely transmission and processing of information on LANs and WANs have become vital to the performance of many businesses. Mission-critical applications, such as telemarketing, order-entry, airline reservation systems and bank electronic funds transfer systems, now reside on LANs and WANs. The financial consequences of network problems that adversely affect these applications can be enormous. Without network analysis products which identify how and where data are moving on local and wide area networks, users of these networks have no means to effectively analyze and monitor performance or to isolate problems for prompt resolution.

Network analyzers monitor the digital traffic or bit stream so as to identify and examine principally the headers and footers of each frame in order to analyze the health of the digital network. Hence, they are often called network protocol analyzers. The period of time during which a network is being analyzed is referred to as a "network monitoring session." Typically, protocol analyzers are designed to identify, analyze and resolve interoperability and performance problems across the principal configurations of LAN and WAN topologies and protocols.

The protocol analyzers enable computer network users to perform a wide variety of network analysis tasks, such as counting errors, filtering frames, generating traffic and triggering alarms. There are many examples of digital network transmission protocol analyzer instruments. One such example is shown in U.S. Pat. No. 4,792,753, granted to Iwai on Dec. 20, 1988. Another digital network transmission protocol analyzer, directed particularly to Token Ring networks, collects several types of information about a network, including statistics, events, and network attributes by analyzing sequences of control frame transmissions and is shown in U.S. Pat. No. 5,097,469, granted to Douglas on Mar. 17, 1992. Many of the protocol analyzer instruments are combined with user interfaces having display and keyboard and/or other input capability. The generation and display of certain message traffic characteristics are addressed in U.S. Pat. No. 3,826,908, granted in July 1974 to Weathers et al. U.S. Pat. No. 4,775,973, granted to Toberlin, et al., on Oct. 4, 1988, discloses a method and apparatus for monitoring protocol portions of digital network transmissions and displaying a matrix of traffic from transmitting stations and to destination stations. U.S. Pat. No. 5,375,126 granted to Wallace on Dec. 20, 1994, discloses a system for testing digital data telecommunication networks, with display of fault analysis, comparative viewing of fault-free benchmark data and with provision to offer suggestions as to probable causes of faults. In the network communications monitor of U.S. Pat. No. 5,442,639, granted on Aug. 15, 1995, to Crowder et al., selected frames may be captured in a capture buffer, stored electronically, and/or displayed in real time. U.S. Pat. No. 5,487,073, granted to Urien on Jan. 23, 1996, discloses commanding a communications coupler to perform a set of network function tests. The network status results of the tests are sent to a data-processing unit for display.

Protocol analyzers are produced in two general types. One is larger, less portable and more comprehensive in the scope of tests which it can perform. This type is used primarily by developers and manufacturers of network systems. The other type is smaller, more portable, and often easier to operate and lower-priced, albeit often with some limitations as to the scope of its testing capability. This latter type of protocol analyzer is produced primarily for field service technicians who maintain computer network systems.

A protocol analyzer's monitoring, diagnostic and problem resolution activities are usually under software control. Such software control is exercised by a main central processing unit (CPU), which is usually one or more microprocessors contained within the protocol analyzer itself. The protocol analyzer may also utilize a separate computer controller, such as a "laptop," to facilitate human interface.

To some degree, the software which protocol analyzers use may be characterized as expert system software which facilitates isolation of problems on a network being analyzed. This expert system software may be contained in the protocol analyzer's internal memory or in the separate computer controller. The utility, efficiency, comprehensiveness, and ease of use of a protocol analyzer, particularly one designed for use by a field technician, is in large part directly proportional to the corresponding capabilities of the software in the protocol analyzer and even in its computer controller.

Current protocol analyzers for use by field technicians have numerous limitations. One such limitation is the inability to analyze and display comprehensive network transmission information in real-time (as the transmissions occur). When analysis of network transmissions must be done off-line, the likelihood that an important network occurrence or "event" will be missed is significantly increased.

In addition, current protocol analyzers do not present network transmission information in sufficiently meaningful or detailed ways, nor do they allow for on-line comparison of current network performance to prior network performance. For example, it would be useful if more meaningful displays of the numerous types of statistics related to the network as a whole or just a given station on the network were available to the user in juxtaposition with other information. Also, many users would like to see complicated information and detailed protocol distribution statistics displayed in a manner that is easier to use and easier visually to understand. Display to the user of more detailed information about anomalies or "events" that occur on the system would be useful to a user, especially if displayed in a more usable form and in "real time" and accumulated over a network monitoring session. Certainly, conveniently-displayed troubleshooting assistance would be helpful, as would visual reporting in "real time" and accumulated over an analysis session. Off-line analysis of selected frames captured during a network monitoring session could be more conveniently displayed to the user.

Finally, while protocol analyzers of the prior art provide reasonable diagnostic capability, they do not guide the field technician through event analysis and the appropriate solutions. In general, these limitations combine to prevent effective guidance to the field technician in actually analyzing and solving the network problem.

SUMMARY OF THE INVENTION

It is an object of the present invention to provide a new and improved protocol analyzer capable of displaying station level statistics, displaying real time event detection, creating baseline network performance information and comparing said baseline information with real-time performance information and displaying to a user the results of that comparison, pre-programming monitoring sessions, generating reports in conjunction with analyzing digital transmission networks, all in real time.

In accordance with one embodiment of the present invention, the operation of a protocol analyzer includes one or more of the following: monitoring, in real time, the transmission of data packets having protocol portions and data portions; identifying the protocol portions of said packets in real time; analyzing, in real time, the protocol portions of said packets to ascertain relevant information; storing said information to a database in real time; sorting said information in real time, according to station level parameters; statistically analyzing said sorted information in real time to obtain statistical information; displaying said statistical information in real-time reports, displaying said statistical information in report formats selected by an operator; displaying real time performance of the network simultaneously with baseline network performance; simultaneously displaying statistical information gathered from a plurality of protocol analyzer instruments; pre-programming the monitoring of the transmission of data packets wherein the operator may select the duration of the network monitoring session; monitoring in real time one or more selected and assorted network parameters and comparing the results of said analysis with arbitrary threshold values for said parameters to determine if the transmission on the network is exceeding said threshold so as to constitute an event; analyzing in real time said sorted information to calculate the probabilities of the possible causes of said ascertained events; and displaying in real time the one or more possible causes of said event.

It is another object of the present invention to analyze and meaningfully display the statistics of the occurrence and distribution of protocols encapsulated within the several levels of the several data frames analyzed by a protocol analyzer instrument.

In accordance with another embodiment of the present invention, the operation of a protocol analyzer includes one or more of the following: monitoring, in real time, the transmission of data packets having protocol portions and data portions; identifying the protocol portions of said packets in real time; analyzing, in real time, the protocol portions of said packets to ascertain relevant information; storing said information to a database in real time; sorting said information according to protocol distribution criteria; statistically analyzing said sorted information; and displaying said statistical information.

In accordance with yet another embodiment of the present invention, the operation of a protocol analyzer includes one or more of the following: monitoring, in real time, the transmission of data packets having protocol portions and data portions; identifying the protocol portions of said packets in real time; analyzing, in real time, the protocol portions of said packets to ascertain relevant information; storing said information to a database in real time; sorting said information according to ISO layer; sorting said information according to protocol sub-families; statistically analyzing said sorted information; and displaying said statistical information in a protocol-tree format.

It is yet another object of the present invention to analyze, store the analysis results and display the analysis results, in real time, of digital data transmission comprising data frames having protocol portions and data portions, without the need to wait for the later analysis of protocol portions of frames, which protocol portions were stored in real time. This and other objects of the present invention are achieved by use of a RISC (Reduced Instruction Set Computer) processor to analyze the protocol portion of each frame, in real time, followed by contemporaneous statistical analysis of the RISC (Reduced Instruction Set Computer) processor analysis of the protocols of several successive frames, followed by substantially simultaneous storage and display of the statistical analysis results.

It is still another object of the present invention to store the results of the analysis of digital data transmission in a database capable of storing and retrieving the analysis results to permit display in real time. This and other objects of the present invention are achieved by use of an object oriented database and object oriented application programming to access said object oriented database.

It is still yet another object of the present invention to log, store, and display digital data transmission events in real time. This and other objects of the present invention are achieved by recognizing, in a protocol analyzer instrument, the occurrence of an event, periodically polling the protocol analyzer instrument for, among other information, a record of events that occurred since the last polling, transmitting, to a user interface, a message containing information about the events that occurred since the last polling, receiving the new event information in an event target ("target" is a term used to identify a software device to which data can be sent for storage, forwarding, or processing), storing the new event information in an event log object in an event log database class, informing a document of receipt of new event information, the document informing an event log view of receipt of new information, obtaining confirmation of new event log information and a pointer thereto in the database, and incorporating the new event information into a display of event log information.

BRIEF DESCRIPTION OF THE DRAWINGS

The present invention will be more fully understood by reference to the following detailed description when considered in conjunction with the following drawings wherein like reference numbers denote the same or similar portions or processes shown throughout the several Figures in which:

FIG. 21 illustrates the appearance of a display screen listing of events.

DETAILED DESCRIPTION OF THE INVENTION

I. Introduction

Figures 1, 2:
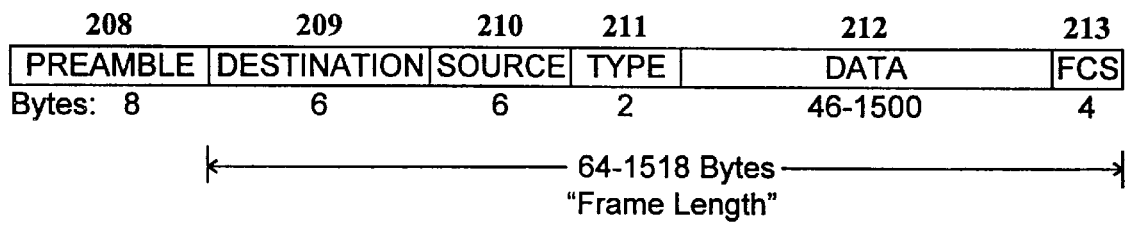
FIG. 1 is an illustration of the hierarchy of network protocol layers.
FIG. 2 is a diagram describing the structure of an Ethernet data frame.

The following detailed description is divided into sections which have section titles to indicate the general nature of the information that follows. The sections and their titles are intended solely to assist in organization of the description and to aid the reader. They are not intended to indicate that information suggested by any one section title is not contained in any other section.

Where the description of the design and operation of the present invention is illustrated by use of an example which is specific to a particular network topology, it may be presumed unless stated otherwise that the network topology is Ethernet. Limiting examples to Ethernet networks is intended only to provide consistency in order to facilitate understanding and is not meant to indicate a limitation of the suitability of the present invention for analyzing other network topologies such as token ring, FDDI, frame relay, etc.

II. Overview of the Implementation of the Invention

The preferred embodiment of the present invention comprises a hardware implementation and a software implementation.

A. Software Implementation

The software implementation of the present invention performs two functions. The first is to perform meaningful statistical calculations on the protocol information retrieved from the network. The portion of the software implementation responsible for performing these calculations will be referred to hereinafter as the "embedded code."

The second function performed by the software implementation of the invention is to provide the software with means for interaction between the protocol analyzer and the operator. Such interaction includes the displaying of the data calculated by the embedded code as well as responding to operator commands. The portion of the software implementation which performs this function will hereinafter be referred to as the "user interface" or "UI." The user interface is preferably coded in the Microsoft Visual C++ programming language produced by Microsoft Corporation at One Microsoft Way, Redmond, Wash. 98052-9953, and operates in the Microsoft Windows 3.1 and Microsoft Windows 95 operating systems, also produced by Microsoft Corporation.

B. Hardware Implementation

The hardware implementation of the present invention likewise performs two functions. First, it provides a physical platform for execution of the embedded code and for interfacing with the network being monitored. This portion of the hardware implementation of the invention will hereinafter be referred to as the "protocol analyzer instrument." The present invention may comprise a plurality of protocol analyzer instruments (see FIG. 3), each having at least one RISC processor and each monitoring a different network or segment of a network or monitoring the same network or segment but at a different port or station on the network.

The second function performed by the hardware implementation is to provide the physical means for the operation of the user interface. Such means include input devices (such as a keyboard, a mouse, a trackball, etc.) and a display device (such as a cathode ray tube monitor or a liquid crystal display). In the preferred embodiment of the invention, this second function is performed by a laptop personal computer (PC) containing an Intel 80486 or Pentium processor operating at 25 MHz or faster, preferably eight megabytes or more of random access memory, a hard disk drive with at least about forty-five megabytes of free disk space, a 3.5 inch floppy disk drive, a bi-directional parallel communication port, a keyboard, and a pointing device such as a trackball, joystick, or mouse. This second portion of the hardware implementation of the invention will be referred to hereinafter as the "PC."

In the preferred embodiment, the PC is connected to one or more protocol analyzer instruments through the PC's parallel communication port. The software implementation (both the embedded code and the user interface) of the invention is stored in a storage device (such as a hard disk drive, a magnetic tape drive, or other similar medium) on the PC. When the operator activates the protocol analyzer instrument, an initialization process takes place in which the embedded code is downloaded from the PC's storage device through the parallel communication port to the protocol analyzer instrument(s).

C. Protocol Analyzer Instrument

Except for the features described herein, the protocol analyzer instrument can be similar to the hardware implementations of conventional protocol analyzers. See U.S. Pat. No. 4,792,753 (mentioned above). In the preferred embodiment of the present invention, the protocol analyzer instrument is a DominoLAN DA-320 Internetwork Analyzer manufactured by Wandel & Goltermann Technologies, Inc. at 1030 Swabia Court, Research Triangle Park, N.C. 27709-3585. (DominoLAN is a trademark of Wandel & Goltermann Technologies, Inc.) The Domino Getting Started Guide, the Domino Operating Guide, the DominoLAN Toolbox Applications, and the Release Notes for the relevant release, all of which are included with the DA-320 analyzer, are hereby incorporated by reference as if fully set forth herein.

The protocol analyzer instrument preferably comprises two hardware modules, a network interface (NI) module and a protocol analysis (PA) module which preferably occupy the same convenient physical cabinet. Each module is controlled by its own INMOS T425 transputer processor operating at 25 MHz and using a 32-bit word RISC (Reduced Instruction Set Computer) architecture ("RISC processor"), manufactured by SGS Thompson Corporation, INMOS, Ltd., 1000 Aztec West, Alnondsbury, Bristol, BS12 4SQ, UK.

These RISC processors are responsible for execution of the embedded code when the protocol analyzer instrument is in use. The use of a processor with a limited instruction set, such as a RISC processor, results in increased processing speed. This increased processing speed allows both the NI and PA modules of the protocol analyzer instrument to perform real time analysis of the network transmissions. While the preferred embodiment utilizes RISC processors to achieve the desired processing speed, alternatives such as the Intel 960 processor manufactured by Intel Corporation, 2200 Mission College Blvd., Santa Clara, Calif. 95052; and the PowerPC processor manufactured by Motorola, Inc., P.O. Box 20912, Phoenix Ariz. 85036, will be readily apparent to a person having ordinary skill in the art. (PowerPC is a registered trademark of International Business Machines Corporation.) The scope of the invention, therefore, should not be limited to the description of the preferred hardware implementation contained herein.

The NI module is preferably equipped with 512 kilobytes of static random access memory (SRAM), while the PA module preferably has four megabytes of dynamic random access memory (DRAM) and is expandable to sixteen megabytes. The preferred protocol analyzer instrument also contains a LAN card printed circuit pack (art number 82C581), which comprises two LAN chips (part number 82C585), purchased from 3Com Corp., and a plurality of hardware counters used to count the number of frames and bytes detected on the network.

D. Data Flow Overview

Figure 3:
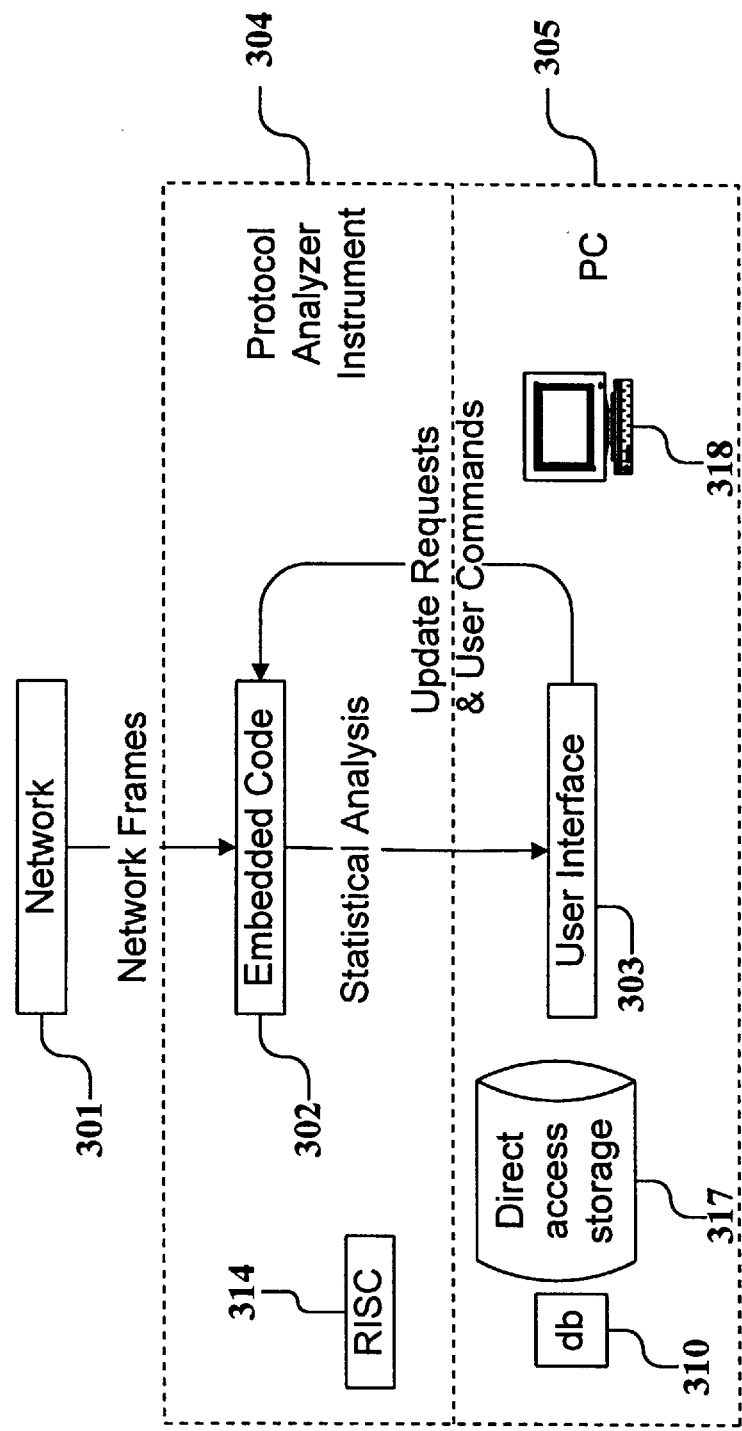
FIG. 3 is a diagram which illustrates the flow of data, analysis, and control in accordance with the present invention.

FIG. 3 illustrates an overview of the flow of information about the operation of a network 301. Data-bearing frames (see FIG. 2) are transmitted over the Network 301 and are received and analyzed by Embedded Code 302 executed by a Protocol Analyzer Instrument 304 using its one or more RISC processors 314 and hard-wired analyzer circuits within the Protocol Analyzer Instrument. The results of that protocol analysis are then available to be sent, as commanded by the user, to a software-based User Interface 303 running on the PC 305 for storage and presentation to the user. The User Interface then presents the analysis results to the user via the PC's display device 318. The User Interface 303 also passes the user's commands (e.g., network parameters to be monitored, sampling rate, etc.) to the Embedded Code 302.

FIG. 3 also illustrates that the PC 305 contains a mass memory device 317, sometimes referred to as a direct access storage device. This is the hard disc drive of the preferred embodiment of the PC 305 that is used, inter alia, to implement the preferred embodiment of the present invention. The User Interface 303 works with a POET object-oriented database program 310 selectively to store, on the mass memory or hard drive 317, the results of the analyses that are performed by the Protocol Analyzer Instrument 304 and which are then periodically uploaded to the PC 305.

III. Frame Analysis

The format of a data frame varies slightly depending on the network type (i.e. token ring network, ethernet, etc.) but the analysis of the frame is basically the same. For example, the format of an ethernet network data frame is illustrated in FIG. 2. The frame begins with an eight-byte Preamble field 208 which is used for synchronization. This is followed by the Destination address 209 (the address of the station which is to receive the data frame). Next is the Source address field 210 (the address of the station which sent the data frame). The address fields contain the Medium Access Control ("MAC") addresses of the source and destination stations. The MAC address is a unique address hard wired into the station's network interface card (NIC). Each address field is six bytes in length. The Type field 211, which follows the address information, is a two-byte field that specifies the higher layer protocol used in the Data field. The Data field 212, which is the only variable-length field, is next and ranges from 46 to 1500 bytes. It contains the higher level protocols currently in use as well as the data being transmitted. Last is a four-byte Frame Check Sequence ("FCS") field 213, which is used for error detection. The term "frame length" refers to the total number of bytes contained in the frame less the number of bytes in the Preamble 208. The contents of each field are identified by the embedded code executed on the protocol analyzer instrument. The exact method by which relevant information is extracted from a frame would be readily apparent to a person having ordinary skill in the art of programming software for protocol analyzers.

In the present invention, frame analysis is performed by the embedded code executed by the protocol analyzer instrument. By performing frame analysis on the protocol analyzer instrument, which preferably contains two RISC processors, the analysis of the frames can be accomplished in real-time. The contents of each frame received during a network monitoring session are temporarily stored in the memory located on the protocol analyzer instrument. The portion of this memory which stores the contents of received frames will be referred to hereinafter as the "capture buffer." The frames stored in the capture buffer will be referred to hereinafter as "captured frames." The contents of the capture buffer are continuously updated. When the buffer is filled, the oldest captured frames are discarded and replaced with newly captured frames.

IV. Filtering

Filtering is the process by which the user can select certain types of frames to be analyzed. The user can specify certain parameters that frames must meet before the frames are sent to the NI module. Filtering is preferably accomplished using a hardware filter, contained within the NI module, such as the filter disclosed in a copending U.S. patent application Ser. No. 08/384,855, filed on Feb. 7, 1995, in the name of Bradley Anderson, which is incorporated by reference to the same extent as if fully reproduced herein now issued as U.S. Pat. No. 5,590,159.

The hardware filter compares incoming bit sequences to the bit sequence which corresponds to the user-defined parameters and only frames containing bit sequences which match the bit sequence corresponding to the user defined parameters are sent to the NI module of the protocol analyzer instrument. These frames are the only frames which are analyzed. As an arbitrary example of the filtering operation, only frames addresses to station A are to be analyzed and/or only frames transmitted by station B are to be analyzed.

V. Embedded Code

A. Station-Level Statistics

Statistics for each station on a network will be referred to hereinafter as "station-level statistics." Station-level statistics such as, but not limited to, number of bytes transmitted, number of frames transmitted, number of bytes received, number of frames received, and total number of errors generated by that station are all calculated by the embedded code running on the protocol analyzer instrument.

As station-level statistics for each station operating on the network are calculated, they are stored in an array called the "station list array" in the memory of the protocol analyzer instrument. An array is a data structure used to store data. Many other data structures, which can also be used to store data, are well known to persons having ordinary skill in the art of programming. The use of the term "array" throughout this specification is not meant to be limited strictly to arrays; because, many of these other data structures would also suffice.

The station list array contains: the station address, traffic statistics (bytes received, bytes transmitted, frames received, and frames transmitted, etc.), and error statistics for each station which is or has been active on the network during the network monitoring session. The type of error statistics calculated will vary depending on the type of network.

Figure 4:
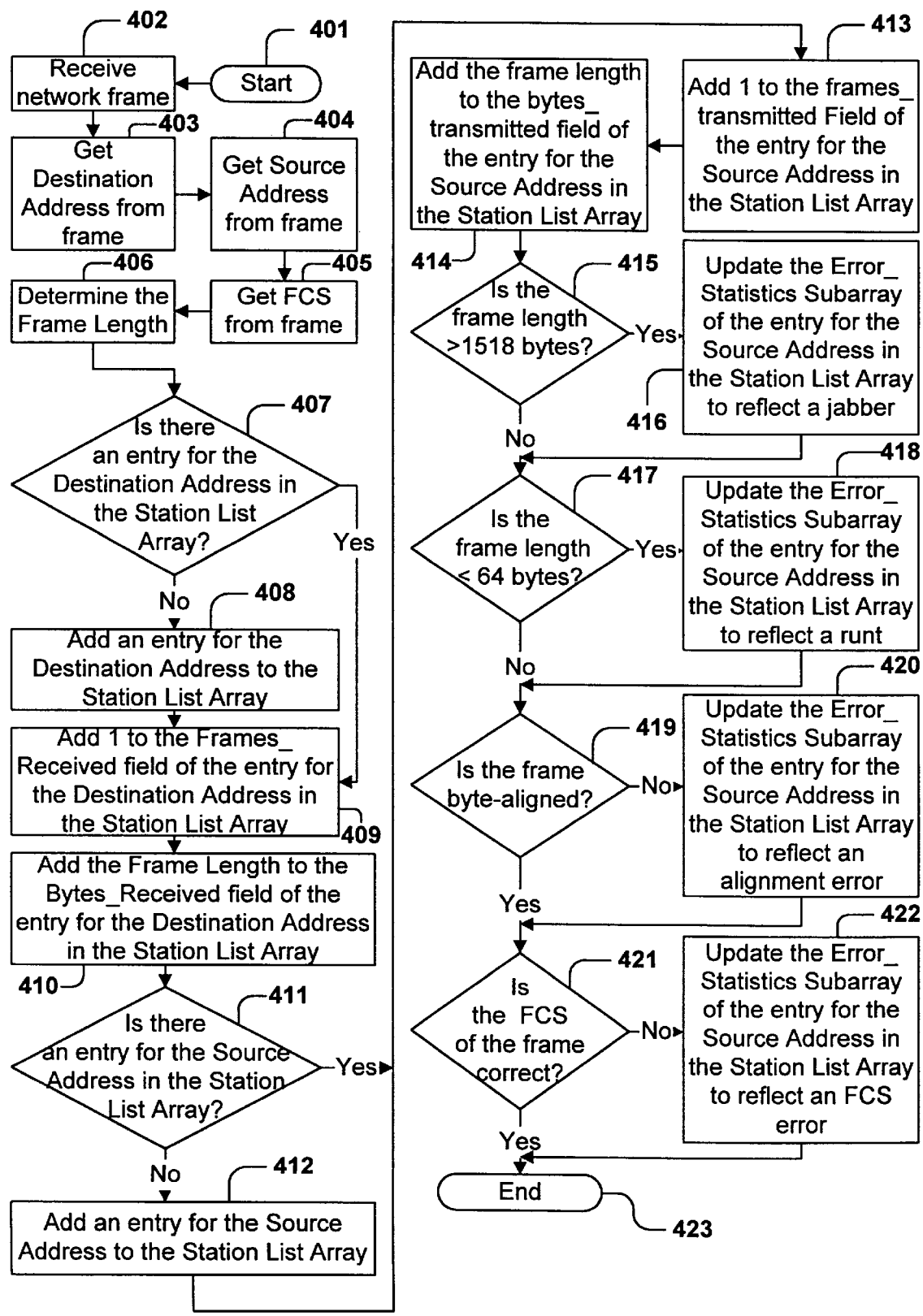
FIG. 4 is a flowchart illustrating the process by which statistics for individual stations on a network (station-level statistics) are calculated.

FIG. 4 illustrates the process by which station-level statistics are calculated for an ethernet network. Station-level statistics which are unique to other network topologies, such as FDDI, Token Ring, frame relay, etc., are calculated in a manner which is analogous to the process described below.

After the start 401 of the station-level statistics calculation, receipt of a frame is recognized at programming step 402 by the protocol analyzer instrument. Next, the address information of each frame is used preferably to identify the destination address at programming step 403 and to identify the source address at programming step 404 for each data frame sent over the network. The destination address portion 209 (see FIG. 2) of the frame is identified, and the bytes contained in that portion of the frame are examined in order to ascertain the destination station to which the frame has been addressed. The source address portion 210 of the frame is identified, and the bytes contained in that portion of the frame are examined in order to ascertain the source station from which the frame was sent.

Preferably, the next step in the calculation of station-level statistics is programming step 405 in which the value of the Frame Check Sequence ("FCS") field 213 is identified in programming step 405. In an ethernet frame, the FCS is contained in the last four bytes of the frame. The FCS is a four-byte cyclic redundancy check ("CRC") or checksum which is calculated by the source station. The source station calculates the FCS by performing a well-known mathematical function on the bits in the Destination 209, Source 210, Type 211, and Data 212 fields of the frame. The FCS is used for purposes of error detection.

The length of the frame is preferably determined in programming step 406 by summing the total number of bytes in the Destination 209, Source 210, Type 211, Data 212 and FCS 213 fields.

The next step 407 is to determine whether there is an entry corresponding to the destination address of the frame in the station list array in the memory of the protocol analyzer instrument. If that particular destination station has previously received or sent any frames during the network monitoring session, there will be an entry corresponding to that destination station's address in the station list array. If that destination station has not yet received or sent any frames during the network monitoring session, there is no entry for that destination address in the station list array. If there is no entry corresponding to that particular destination address in the station list array, an entry corresponding to that destination address is created by programming step 408.

The frames_received array variable of the station list array entry corresponding to the destination address is incremented by one at the programming step 409.

Where used, an underscore within a term denotes a variable name as opposed to a value or definition. Also, an array is a memory structure.

Similarly, the bytes_received array variable of the station list array entry corresponding to the destination address is incremented in step 410 by the frame length of the current frame.

The step 411 determines whether there is an entry corresponding to the source address of the frame in the station list array. If the source station has previously received or sent any frames during the network monitoring session, there will be an entry corresponding to the source station's address in the station list array. If the source station has not yet received or sent any frames, there is no entry for the source address in the station list array. If there is no entry corresponding to the source address in the station list array, an entry corresponding to the source address is created by step 412.

The frames_transmitted array variable of the station list array entry corresponding to the source address is incremented by one at programming step 413. Similarly, the bytes_transmitted array variable of the station list array entry corresponding to the source address is incremented by the frame length of the current frame in step 414.

The next steps involve updating the error_statistics array variable of the entry in the station list array corresponding to the source address. The error_statistics array variable is actually a subarray whose length depends upon the number of types of errors detected for the particular network topology. It contains the error_id and the number_of errors for each type of error detected for the corresponding station. The error_id is an arbitrary, predefined code which represents one of several types of errors that the protocol analyzer instrument is equipped to recognize. For an ethernet network, these errors include but are not limited to "jabbers," "runts," "alignment errors," and "FCS errors." Each of these errors is discussed in detail below. Number_of_errors represents the number of occurrences of the particular error type attributable to the corresponding station.

The first step 415 in updating the error_statistics subarray of the entry in the station list array corresponding to the source address of the current frame is to determine whether the length of the current frame is greater than the maximum 1518 bytes permitted in an Ethernet frame. Such overly-long frames are commonly referred to as jabbers. Jabbers originate from a source station that will not stop transmitting. If a frame's length is greater than 1518 bytes, it is likely that the source station is defective. If the current frame is a jabber, the error_statistics subarray of the entry in the station list array corresponding to the source address is updated accordingly at programming step 416.

Step 417 determines whether the frame length of the current frame is less than 64 bytes. Such frames are commonly referred to as runts. Runts are short frames which may also indicate that the source station is defective. If the current frame is a runt, the error_statistics subarray of the entry in the station list array corresponding to the source address is updated accordingly in step 418.

Programming step 419 determines whether the current frame is byte-aligned. A frame is said to be byte aligned if the frame size in bits is evenly divisible by eight. For this purpose, the frame size is said to be equal to frame length (expressed in bits) plus the length of the preamble (also expressed in bits). That is, the existance of an arithmatic remainder from the division by eight of the number of bits in the frame plus preamble indicates that the frame does not contain a whole number of bytes.

The determination of whether a frame is byte-aligned is done by the LAN chip on the protocol analyzer instrument (mentioned above under Protocol Analyzer Instrument). If the current frame is not byte aligned, an alignment error has occurred. The error_statistics subarray, of the entry in the station list array corresponding to the source address, is updated accordingly by programming step 420.

As discussed above, the source station calculates the FCS by performing a mathematical function on the bits in the Destination, Source, Type, and Data fields of the data frame. The LAN chip, also discussed above, performs the same mathematical function and compares the results to the contents of the FCS. If the two do not match, an FCS error has occurred, indicating that the frame is corrupt. Step 421 examines the results of that calculation and comparison by the LAN chip in order to determine whether one or more bits of the current frame may have been corrupted in transmission.

If the current frame contains an FCS error and is thus corrupt, the error_statistics subarray of the entry in the station list array corresponding to the source address is updated accordingly in step 422.

After all of the above station-level statistics and any other desired station-level statistics have been calculated, the final step involves transmitting the information stored in the station list array to the PC for use by the user interface. This transmission is facilitated through the use of a "message," which is the preferred method of communication among the various hardware and software components of the preferred embodiment of the present invention.

The message for station-level statistics consists of a header and the contents of the station list array. The header identifies the destination for the message and the type of message, in much the same format as the messages illustrated in FIGS. 6, 11, and 12. In this case, the message would be a station-level statistics update message. The contents of the station list array are placed in the message in the order in which they were initially placed in the station list array.

When the User Interface (UI) software in the PC requests information on station-level statistics, the message is sent from the protocol analyzer instrument to the PC for use by the user interface. A person having ordinary skill in the art of digital transmission protocol analyzers will know that station-level statistics peculiar to other network topologies can be calculated in a similar manner.

B. Network Statistics

Statistics based upon network performance as a whole will be referred to hereinafter as "network statistics." Network statistics are calculated by the embedded code running on the protocol analyzer instrument. Network statistics may be cumulative (calculated over the entire network monitoring session, which might typically be a twenty-four-hour period) or per sampling period (calculated over a sampling period specified by the user, which might typically be a one-second period).

Network statistics may also vary somewhat between the various network topologies. For example, network statistics calculated for an ethernet network include number of Network Frames Received, Network Frame Rate, number of Analyzer Frames Received, Analyzer Frame Rate, Peak Analyzer Frame Rate, Peak Frame Rate Timestamp, Average Frame Rate, Average 32-Second Frame Rate, Utilization, Average Utilization, Peak Utilization, Peak Utilization Timestamp, number of Broadcast Frames Received, number of Multicast Frames Received, Frame Size Distribution-Cumulative, Frame Size Distribution-Sample, number of Network Collisions, number of Alignment Errors and the numbers of Jabber, Runt, and FCS Errors. Each of these statistics is discussed below.

Figure 8:
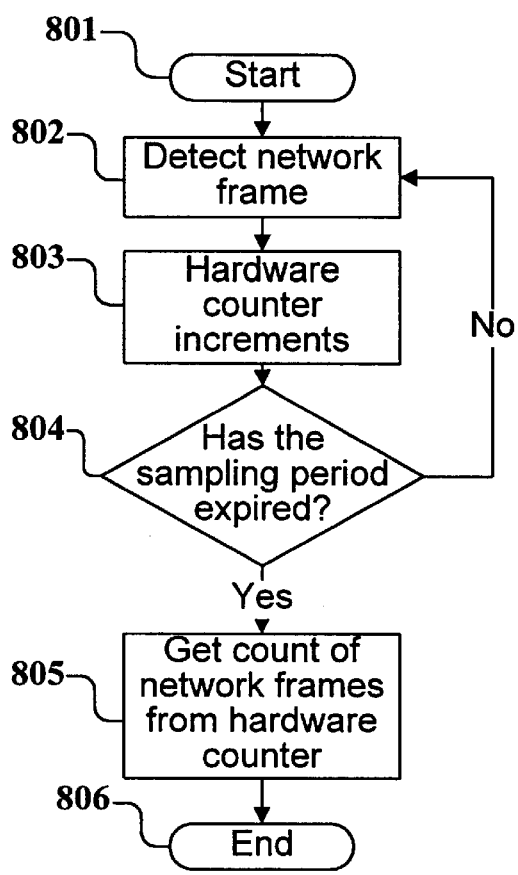
FIG. 8 is a flowchart illustrating the method by which the Network Statistic "Network Frames Received" is calculated.

Referring now to FIG. 8, the number of Network Frames Received is calculated by a hardware counter on the protocol analyzer instrument. From the Start step 801, the protocol analyzer instrument detects receipt of a network frame in programming step 802. The hardware counter is connected directly to the network line and is able to count every frame traveling over the network, i.e. Network Frames Received. For each frame detected, the hardware counter is incremented in step 803. This process is repeated until the sampling period has expired, step 804. When the network monitoring session has ended, it ends at some point after or to coincide with the expiration of a sampling period. The number of Network Frames Received is then obtained from the hardware counter by the Embedded Code software in the protocol analyzer instrument, step 805, for later uploading to the PC.

Similarly, the Network Frame Rate is the number of Network Frames Received, preferably over a one second interval, as monitored by a hardware counter, and is calculated every second.

As the NI module of the protocol analyzer instrument receives frames, these frames are transmitted to the PA module of the protocol analyzer instrument, where the frames are processed. However, if the Network Frame Rate is extremely high, some of the frames may not be sent to the PA module for processing. In this situation, some of the frames will still be counted as having been received by the NI module but may never be processed or analyzed by the PA module, see discussion above regarding Frame Analysis for a discussion of some of the types of frame analyses that may be performed by the PA module.

In addition, the user has the option of choosing to monitor only certain types of frames, see discussion above under Filtering. In this case, all of the frames that are received by the NI module will still be counted as having been received, in order to arrive at the number of Network Frames Received. However, only frames which meet the user-defined parameters are passed to the PA module. Therefore, in these situations when only selected types of frames are passed to the PA module for analysis, the number of frames actually sent to the PA module is different from the value of Network Frames Received.

Figure 9:
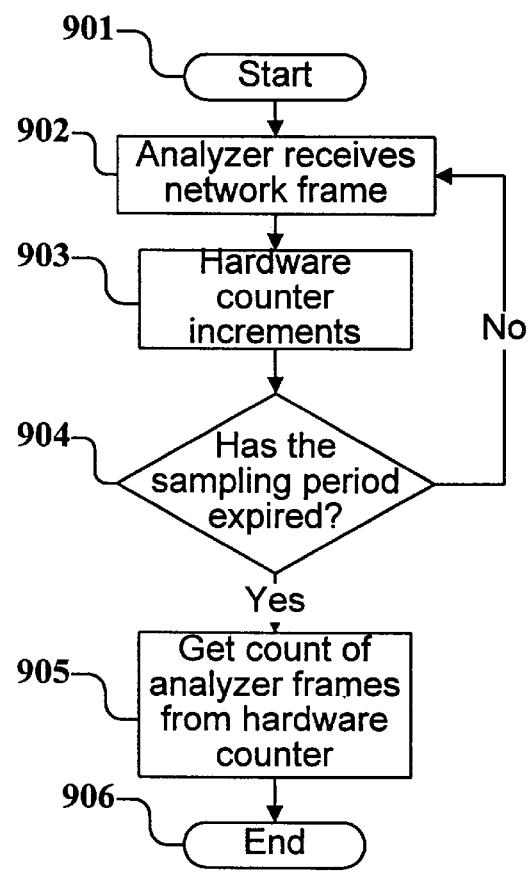
FIG. 9 is a flowchart illustrating the method by which Network Statistic "Analyzer Frames Received" is calculated.

The number of frames actually sent to the PA module is referred to as the Analyzer Frames Received. The Analyzer Frames Received are calculated by the program shown in FIG. 9. From the Start step 901, the PA module of the protocol analyzer instrument receives a frame from the NI module in step 902. Another hardware counter is incremented accordingly in step 903. The process is repeated until the sampling period has expired, step 904. The final count is then obtained by the Embedded Code from the counter in step 905 for later uploading by the PA module to the PC.

Similarly, Analyzer Frame Rate is the number of Analyzer Frames Received, preferably over a one second interval and is calculated every second. The highest frame rate (in frames per second) detected during the network monitoring session by the analyzer for any single sampling period and the time at which it occurred represents Peak Analyzer Frame Rate and Peak Frame Rate Timestamp. For each sampling period, the current Analyzer Frame Rate is compared to the Peak Analyzer Frame Rate. If the current Analyzer Frame Rate is greater than the Peak Analyzer Frame Rate, the Peak Analyzer Frame Rate is replaced with the current Analyzer Frame Rate. The Peak Frame Rate Timestamp is then replaced with the current time.

The Average Frame Rate is calculated in a manner similar to the Analyzer Frame Rate except that the Average Frame Rate is averaged over the time elapsed during the Network Monitoring Session rather than over one second. Similarly, the Average 32-Second Frame Rate represents the Average Frame Rate over the past 32 seconds as opposed to the entire Network Monitoring Session. Therefore, for the first thirty-one seconds of a monitoring session, there will be no value for Average 32-Second Frame Rate.

After the first thirty-two seconds, the Average 32-Second Frame Rate is recalculated every second on a rolling basis (the frame rate is averaged over the most recent thirty-two second time span).

The embedded code on the protocol analyzer instrument is responsible for calculating the Network Utilization statistic. Network Utilization represents the percentage of the theoretical network bandwidth that is currently being used. For an ethernet network, the theoretical network bandwidth is ten million bits per second (ten megabaud). This is equivalent to 1,250,000 bytes per second (one byte=eight bits).

The embedded code calculates Network Utilization every second in the following manner. First, the total number of bytes represented by the Preamble 208, Destination 209, Source 210, Type 211, Data 212 and FCS 213 fields of each frame (see FIG. 2) received during the second are summed. To this is added an additional twelve bytes for each frame received during a sampling period to represent quiet time. Quiet time is a 9.6 microsecond interval that follows each frame, during which no data are sent over the line. At a ten megabaud transmission rate, that 9.6 microseconds is equivalent to ninety-six bits or twelve eight-bit bytes. Therefore, quiet time is the equivalent of twelve byte times.

The embedded code then divides this value by 12,500 (1,250,000 bytes/sec×100%). The resulting percentage statistic is referred to as Network Utilization. Average Utilization is an average of all Utilization values over the duration of the network monitoring session.

Peak Utilization represents the highest percentage of network capacity used during the current session and Peak Utilization Timestamp represents the time at which the peak utilization was detected. For each sampling period, the current Utilization is compared to the Peak Utilization. If the current Utilization is greater than the Peak Utilization, the Peak Utilization is replaced with the current Utilization. The Peak Utilization Timestamp is then replaced with the current time.

Frame Size Distribution is the network statistic that represents the number of frames, classified by size range, that were received by the protocol analyzer instrument since the analyzer was started for the monitoring session (Frame Size Distribution-Cumulative) or during a specified sampling period (Frame Size Distribution-Sample). Frame Size Distribution is calculated through the use of two memory arrays which store information on frame size distribution. One array stores frame size distribution on a cumulative basis and the other array stores frame size distribution on a sampling period basis. There are positions in both arrays corresponding to arbitrary size ranges (e.g. the value for the number of frames detected with lengths between 167 and 255 bytes is stored in position 2 of each array).

The above process is summarized as follows: The frame length of each frame (see Frame Analysis above) is examined. Next, the appropriate memory-array position of the cumulative array is incremented by one to reflect the occurrence of a frame in that particular size range. If the frame was detected during the sampling period, the appropriate array position of the sampling period array is also incremented by one.

As discussed above, under Protocol Analyzer Instrument, the protocol analyzer instrument includes a commercially-obtained LAN chip. The LAN chip is responsible for calculating Broadcast Frames Received, Multicast Frames Received and Network Collisions.

A broadcast frame is a frame sent from one station to all other stations on the network. A broadcast frame's destination address contains an address (referred to as a "broadcast address") that all other stations recognize as being addressed to them. Similarly, a multicast frame is a frame sent to a selected group of stations on a LAN. A multicast frame contains an address (referred to as a "multicast address") that the selected group of stations recognize as being addressed to them. By examining the Destination address field 209 (FIG. 2) of an incoming network frame, the LAN chip can recognize a broadcast address or a multicast address. If the Destination address field 209 contains an address which represents a broadcast or multicast address, the respective counter corresponding to either broadcast frames or multicast frames on the NI module is incremented by one. These counts represent the Broadcast Frames Received and Multicast Frames Received statistics.

Collisions occur when two stations on an Ethernet network stations attempt to transmit frames at the same time, resulting in their transmissions "colliding." Access to an Ethernet network is regulated by a Carrier Sense Multiple Access/Collision Detection (CSMA/CD) contention-based algorithm which is well known to a person having ordinary skill in the art. An Ethernet station listens to the network to determine whether any traffic is present. When the network is clear, it transmits and then listens again to see if the data collides with traffic from any other station. If all is clear, the transmission is complete. If a collision occurs, the station waits a short, random amount of time and retransmits. The LAN chip detects collisions by performing the standard CSMA/CD algorithm when a frame is received. If a collision is detected, a collision counter is incremented by one. This counter is part of the LAN chip.

The present invention also calculates network-wide statistics for errors such as Alignment Errors, Jabbers, Runts, and FCS Errors (see Station Level Statistics above for detailed definitions of these errors). These errors are detected by the LAN chip on the protocol analyzer instrument in a manner similar to that described above.

The network statistics which are unique to other network topologies, such as token ring, FDDI, frame relay, etc., are calculated in a manner which is analogous to the above process.

Information on all network statistics are stored into an array ("network statistics array"). The information stored for each statistic varies depending on the type of statistic, but basically, the value of each statistic is stored into an array along with a timestamp.

Figure 12:
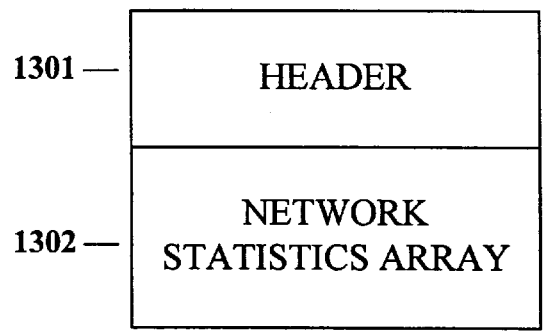
FIG. 12 illustrates the structure of a Network Statistics Update Message.

When the UI requests information on network statistics, the information stored in the network statistics array is sent to the PC for use by the user interface. This transmission is facilitated through the use of a message. The structure of a network statistics update message is shown in FIG. 12.

The message for network statistics consists of a header 1301 and the contents of the network statistics array 1302. The header identifies the destination for the message and the type of message (network statistics update message in this case). The contents of the network statistics array are placed in the message in the order in which they were initially placed in the network statistics array.

It will be evident to a person having ordinary skill in the art that network statistics for other network topologies can readily be calculated in a similar manner.

C. Protocol Distribution

The distribution and percentage distribution of the various protocols present in data frames are hereinafter referred to as "protocol distribution". The calculation of protocol distribution is performed by the embedded code executed by the protocol analyzer instrument.

Figure 7:
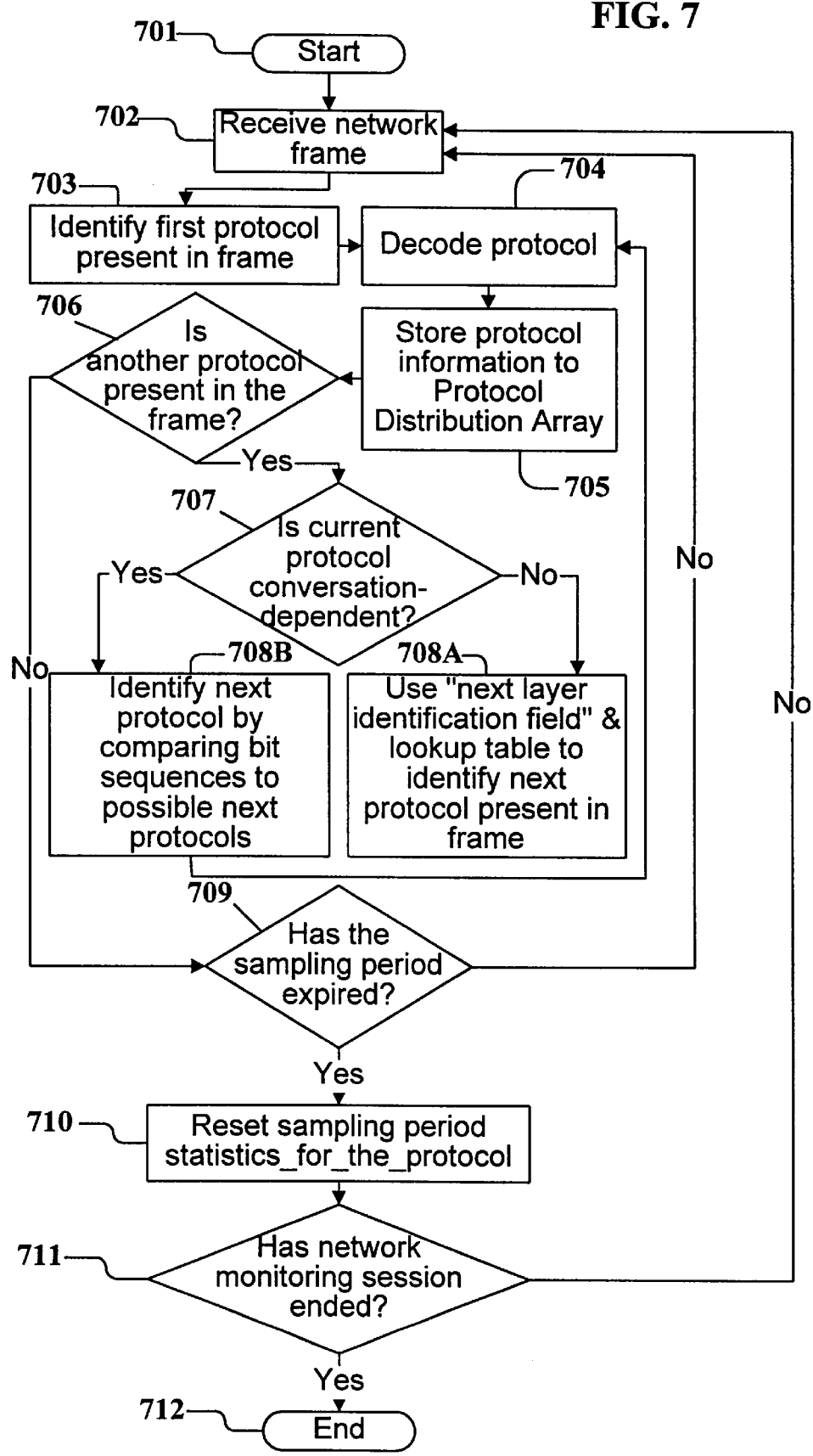
FIG. 7 is a flowchart illustrating the method by which protocol distribution is calculated.

Referring now to FIG. 7, after the start step 701, the protocol distribution calculation begins with programming step 702 in which the network frame is received. Step 703 next determines the first protocol present in the frame received by the protocol analyzer instrument. For an ethernet frame, this is done by looking at the Type field 211 (see FIG. 2) of the frame. The Type field 211 of an ethernet frame designates the first protocol present in the Data field 212 of the frame. If the Type field 211 contains a value greater than hexadecimal 500, the first protocol present is the Ethernet Version 2 (EthernetV2) protocol, otherwise the first protocol present is the IEEE 802.3 protocol. This first protocol (either the EthernetV2 protocol or IEEE 802.3 protocol) is found in the data portion 212 of the frame.

Next, that protocol (and subsequently all other protocols contained in the frame) is decoded in step 704. The protocol being decoded at any particular time is referred to as the current protocol.

Figure 5:
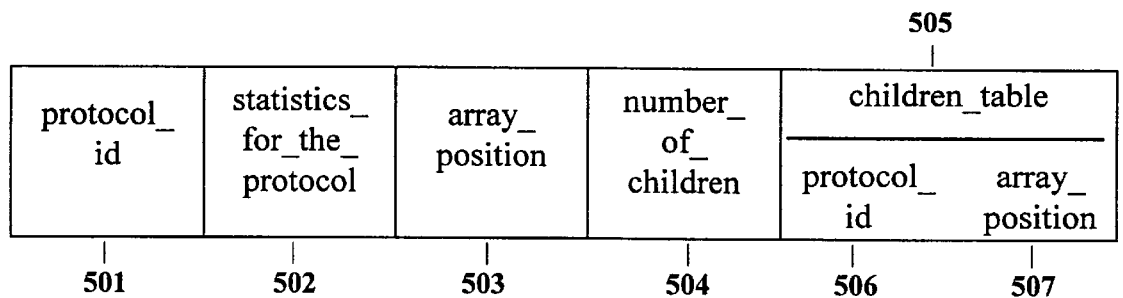
FIG. 5 is a diagram illustrating the structure of an entry in the protocol distribution array within a digital memory.

The next step 705 involves storing information for the current protocol. Information on the current protocol is stored in a memory array. An entry in this array is shown in FIG. 5 ("protocol distribution array entry") and contains: the protocol_id 501, statistics_for_the_protocol 502, array_position 503, number_of_children 504, and a children_table 505. Each of these array variables is discussed below. Array information for a protocol is updated whenever that particular protocol is detected in a received frame.

If the current protocol has not previously been detected, a new array entry is created for that protocol. Additionally, if the current protocol is encapsulated within the frame differently than prior occurrences of that protocol, a new array entry is created. The protocol distribution array is stored in the memory of the protocol analyzer instrument and is maintained for the duration of the network monitoring session.

The protocol_id 501 array variable is a programmer defined, arbitrary number used by the embedded code to identify the current protocol. The protocol_id 501 is used to help identify the protocol in the protocol distribution array and has no relationship to the "next layer protocol identification field" defined above. The "next layer protocol identification field" contains a value which is used to identify the protocol directly encapsulated within the current protocol. When this encapsulated protocol is placed into the array, it will be assigned a protocol_id 501 distinct from the value which was in the "next layer protocol identification field" (the value used to initially identify the encapsulated protocol).

The statistics_for_the_protocol 502 includes four entries: (1) the number of frames received (on a cumulative basis for the network monitoring session) which contained the current protocol; (2) the total number of bytes (cumulative basis for the network monitoring session) within those frames (cumulative number of frames) containing the current protocol; (3) the number of frames received (per sampling period, i.e. the sampling time period specified by the user) which contained the current protocol; (4) the total number of bytes (per sampling period) within those frames (sampling period frames). Statistics which are calculated per sampling period are reset at the expiration of the sampling period.

The array_position 503 indicates the position, in the protocol distribution array, where the information on the current protocol is stored.

The number_of children 504 for a particular protocol (the "parent") represents the total number of unique children detected for the parent protocol since the network monitoring session began. A "child" of a parent protocol is any protocol which is encapsulated directly (immediately follows) within the parent.

The children_table 505 is a subarray containing information for all of the children of the parent. This information includes the protocol_id 506 of the child and the array_position 507 of the child.

The next step (step 706) in calculating protocol distribution is to determine if there is another protocol (the "next protocol") encapsulated within the current protocol. If there is a next protocol encapsulated within the data portion 212 of the current protocol or frame, there are two methods used to identify it.

Most protocols contain a "next layer protocol identification field" which is much like the Type field 211 of the Ethernet frame and contains a numerical identification code corresponding to the next protocol present in the frame (i.e., the protocol encapsulated directly within the first protocol). The exact location and contents of the "next layer protocol identification field" within a protocol can vary depending on the standards for that type of protocol. For example, the IEEE 802.3 protocol is defined by the Institute of Electronics and Electrical Engineers' standard 802.3.

Some protocols, however, either do not contain a "next layer protocol identification field" or their "next layer protocol identification field" contains insufficient information for any station other than the ones that are communicating to identify the next protocol. These protocols, including Transport Control Protocol ("TCP") and User Datagram Protocol ("UDP"), are referred to as "conversation-dependent" protocols. Step 707 determines whether the current protocol is conversation-dependent.

If the current protocol is not conversation dependent, it's "next layer protocol identification field" is preferably used in conjunction with a lookup table in step 708A to identify the next protocol present in the frame. This lookup table is stored in the memory of the protocol analyzer instrument. The lookup table maps the value found in the "next layer protocol identification field" to the corresponding protocol which now identifies the protocol encapsulated directly within the data portion 212 of the current protocol.

If, however, it is determined in Step 707 that the current protocol is a conversation-dependent protocol, the unknown next protocol encapsulated within the current protocol is detected in step 708B by comparing bit sequences of the unknown next protocol to known bit patterns from the protocols which can be encapsulated within the current protocol. These known bit patterns can be obtained by referencing the standard defining the protocol. For instance, the UDP protocol is defined by Request for Comments (RFC) number 768, promulgated by the Institute of Electronics and Electrical Engineers. Similarly, the TCP protocol is defined by Request for Comments (RFC) number 793, promulgated by the Institute of Electronics and Electrical Engineers. The known patterns are preferably contained in a lookup table which is used to map known bit patterns to corresponding protocols.

As an example, if the current protocol is UDP, the bits in the unknown next protocol would be compared to bit patterns known to exist in the DHCP (Dynamic Host Configuration Protocol), BootP (Bootstrap Protocol), NetBIOS DGM (Datagram Protocol), RIP (Routing Information Protocol), RWHO (Remote Unix WHO Protocol), TACACS, SNMP (Simple Network Management Protocol) Version 2, and NTP (Network Time Protocol) protocols, all of which can be encapsulated within the UDP protocol.

If a bit sequence in the unknown next protocol sufficiently resembles a bit pattern known to exist in any of these protocols, the protocol corresponding to the known pattern is deemed to be the unknown next protocol and is detected as such.

The above processes are performed iteratively (due to Step 706) for each protocol present in the frame until all protocols present in the frame have been decoded. The entire process is repeated for all frames detected during the sampling period (step 709) or detected during the network monitoring session (step 711), as specified by the user. Upon the expiration of a sampling period, the statistics_for_the_ protocol which are calculated per sampling period are reset in step 710.

Figure 6:
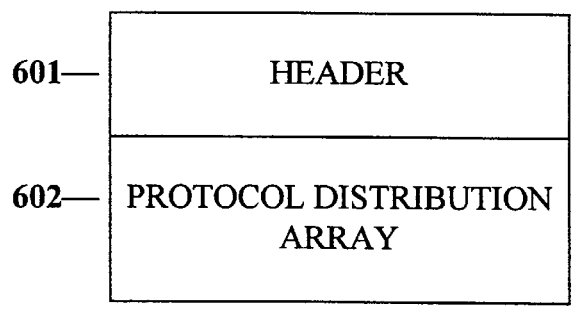
FIG. 6 is a diagram illustrating the structure of the message for a protocol distribution update.

After the protocol distribution has been determined by the protocol analyzer instrument and before the step 710 reset operation, the information stored in the protocol distribution array is transmitted to the PC for use by the user interface. This transmission is facilitated through the use of a message. The structure of a protocol distribution update message is shown in FIG. 6.

The message for protocol distribution consists of a header 601 and the contents of the protocol distribution array 602. The header identifies the destination for the message and the type of message (protocol distribution update message in this case). The contents of the protocol distribution array are placed in the message in the order in which they were initially placed in the protocol distribution array.

When the UI requests information on protocol distribution, the message is sent from the PA module of the protocol analyzer instrument to the PC for use by the user interface.

D. Event Information

The embedded code is also capable of detecting and logging "events" in real-time during network monitoring sessions. An "event" occurs when a parameter being monitored on the network exceeds a predefined or user-defined threshold. That user-defined threshold can even be a number of occurrences on the network of some specific phenomenon, during a sampling period. The threshold specifies a value (e.g. number of occurrences, in the case of parameters such as runts, jabbers, etc., or percentage, in the case of a parameter such as Network Utilization) per specified time period and the number of consecutive time periods for which the value must be exceeded to constitute an event. For example, a user can set a threshold, for the parameter runts, of five runts per ten minute sampling period for two consecutive sampling periods. If more than five runts are detected in each of two consecutive sampling periods, the occurrence would be logged as an event.

Ethernet events detected include: High Utilization, High Frame Rate, High Broadcast Rate, High Multicast Rate, Network Collisions, Alignment Errors, FCS Errors, Runts, Jabbers, and Illegal Source Address. Events which are unique to other network topologies, such as FDDI, Token Ring, frame relay, etc., are detected in a manner which is analogous to the process for detecting ethernet events described below.

Utilization, Frame Rate, Broadcast Rate, Multicast Rate, Network Collisions, Alignment Errors, FCS Errors, Runts, and Jabbers are all calculated by the LAN chip on the protocol analyzer instrument. For a discussion of how these rates and errors are calculated or detected, see Station-Level Statistics and Network Statistics above. These rates and errors are flagged as events when they exceed defined thresholds.

An Illegal Source Address error occurs when a frame containing an illegal MAC source address is received. An illegal MAC source address field might contain all binary ones. Such illegal MAC addresses can be caused by a malfunctioning network interface card ("NIC") or NIC driver, they can be artificially produced by some type of traffic generator, or they might be the result of a collision. An Illegal Source Address event occurs when any Illegal Source Address error is detected by the protocol analyzer instrument (i.e., the threshold for this event is usually zero).

Internet Protocol ("IP") events include: Duplicate IP Address, Illegal Source IP Address, and Zeros Broadcast Address. The errors which are the bases of these events only occur if the IP "protocol" is currently in use. The presence, if any, of the IP "protocol" in a frame is detected during the protocol decode process described in detail above in Protocol Distribution. The IP "protocol" contains a field identifying the IP Source Address. This field will be referred to as the "IP Source Address field." The IP "protocol" also contains a field identifying the IP Destination Address. This field will be referred to as the "IP Destination Address field."

A Duplicate IP Address error occurs when two stations try to use the same network IP address. This error is detected by analyzing the IP Source Address field of the IP "protocol." A memory array or other data structure ("IP station list") is used to store information on all detected IP addresses. An array or other data structure ("MAC station list") is used to store information on MAC addresses. These two station lists are cross referenced with each other through the use of linkages and pointers to determine the relationship between every MAC address and every IP address. In other words, every IP address is associated with a MAC address. One MAC address can have several IP addresses but each IP address can correspond to only one MAC address. If two MAC stations in the MAC station list are using the same IP address, a Duplicate IP Address error has occurred. A Duplicate IP Address event occurs when any Duplicate IP Address error is detected by the protocol analyzer instrument (i.e., the threshold for this event is also usually zero).

An Illegal Source IP Address error occurs when the IP Source Address field of the IP "protocol" contains invalid data such as all zeros, a broadcast address, or a multicast address. This error is detected by analyzing the IP Source Address field of the IP "protocol." An Illegal Source IP Address event occurs whenever an Illegal Source IP Address error has been detected by the protocol analyzer instrument (i.e., the threshold for this event is also zero).

A Zeros Broadcast Address error occurs when a sending station has used all zeroes to represent a broadcast address in the portion (IP Destination Address) of the IP "protocol" containing the IP destination address. This error is detected by analyzing IP Destination Address field of the IP "protocol." The IP Destination Address should be all ones when used to designate a broadcast address. A Zeros Broadcast Address event occurs whenever the number of Zeros Broadcast Address errors detected by the protocol analyzer instrument exceeds the defined threshold defined for this event.

ICMP (Internet Control Message Protocol) events include: Host Unreachable, ICMP Redirect, ICMP Parameter Error, Network Unreachable, Port Unreachable, Source Quench, and Time-to-Live Exceeded. The messages which are the bases of these events only occur if the ICMP "protocol" is currently in use. The presence, if any, of the ICMP "protocol" in a frame is detected during the protocol decode process described in detail above in Protocol Distribution.

A Host Unreachable message (a network message not related to a "message" sent by the PA to the UI) is sent by a router to notify the sender of a frame that the router cannot forward that frame to the appropriate destination. A router is a software or hardware connection between two or more networks that enables traffic to be routed from one network to another based upon the intended destinations of the traffic. The appropriate field of the ICMP "protocol" is analyzed to determine whether a Host Unreachable message has been received. A Host Unreachable event occurs when the number of Host Unreachable messages received by the protocol analyzer instrument exceeds the defined threshold for this event.

An ICMP Parameter Error is a message (another network message) indicating that a frame has been discarded due to a problem in its header portion. The appropriate field of the ICMP "protocol" is analyzed to determine whether an ICMP Parameter Error message has been received. An ICMP Parameter Error event occurs when the number of ICMP Parameter Error messages received by the protocol analyzer instrument exceeds the defined threshold for this event.

An ICMP Redirect message (also another network message) occurs when a sending station addresses a frame to a default router because it does not know any other route for that particular destination. If the default router sees that it must transmit the frame out of the same port on which it was received, the router sends the host an ICMP Redirect message advising the sending station of a better router for that destination. The appropriate field of the ICMP "protocol" is analyzed to determine whether an ICMP Redirect message has been received. An ICMP Redirect event occurs when the number of ICMP Redirect messages received by the protocol analyzer instrument exceeds the defined threshold for this event.

A Network Unreachable message (another network message) is sent from a router to the sender of a frame when the router does not have a route or a default route to which to forward the data frame. The appropriate field of the ICMP "protocol" is analyzed to determine whether a Network Unreachable message has been received. A Network Unreachable event occurs when the number of Network Unreachable messages received by the protocol analyzer instrument exceeds the defined threshold for this event.

A Port Unreachable message (another network message) is sent by a destination station to inform the source station that the port indicated by the source station is not currently in use by any process. The appropriate field of the ICMP "protocol" is analyzed to determine whether a Port Unreachable message has been received. A Port Unreachable event occurs when the number of Port Unreachable messages received by the protocol analyzer instrument exceeds the defined threshold for this event.

A Source Quench message (another network message) is sent, by a router or a host, stating that it is receiving so many data frames that its buffers are overflowing. The message is sent back to the source of the excess data frames instructing that source station to slow the flow of data. The appropriate field of the ICMP "protocol" is analyzed to determine whether a Source Quench message has been received. A Source Quench event occurs when the number of Source Quench messages received by the protocol analyzer instrument exceeds the defined threshold for this event.

A Time-to-Live Exceeded message is generated by a router which has received and discarded a transmission which has exceeded its allowable lifetime. Sometimes routing loops form between routers that cause a frame to be forwarded endlessly through the same set of routers over and over. In the IP "protocol," there is a field, called the time-to-live (TTL) field, that limits the lifetime of a frame containing the IP "protocol." The TTL field prevents such an occurrence. When a host generates an IP message (another network message), it gives the TTL field a number value between one and 255. The value is basically equal to the number of routers that can forward the IP message. Each time a router forwards the IP message it reduces the TTL number by one. If a router receives an IP message with a TTL value of one, it decrements the TTL number to zero and discards the message.

The router transmits a Time-to-Live Expired message back to the source to notify the source about the discard. The appropriate field of the ICMP "protocol" is analyzed to determine whether a Time-to-Live Expired message has been received. A Time-to-Live Expired event occurs when the number of Time-to-Live Expired messages received by the protocol analyzer instrument exceeds the defined threshold for this event.

As events are detected, information on the events including event_id, timestamp, byte_length, and parameters are stored in a circular array (event log array). The use of two pointers (one to denote the memory location of the recordation of the last event detected and the other to denote the memory location of the last event sent to the UI) and a circular array allows event updates to be sent to the PC when requested by the UI.

Figure 10:
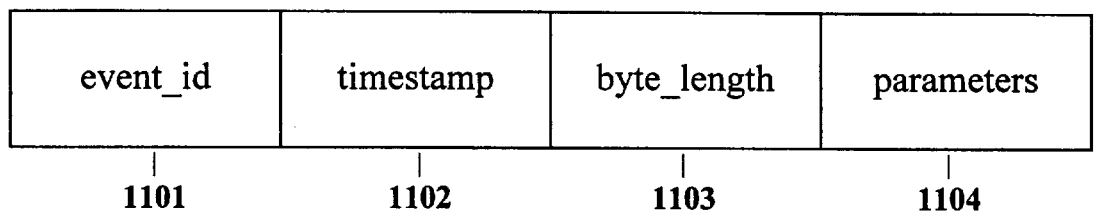
FIG. 10 illustrates the structure of an entry in the Event Log Array.

The structure of an entry in this circular array is shown in FIG. 10. "Event_id" 1101 is the variable name used to refer to the programmer-defined id code of the event. Timestamp 1102 is the date and time at which the specific event occurred. Byte_length 1103 is the total number of bytes in the parameter 1104 portion of the array entry. Parameter 1104 contains information on each event. This parameter information is used by the UI portion to construct a detailed event message for display or reporting of the event to the user. For example, if the error was Duplicate IP Address Detected, there would be three parameters, namely the MAC addresses of the two stations using the same IP address as well as the IP address itself.

Figure 11:
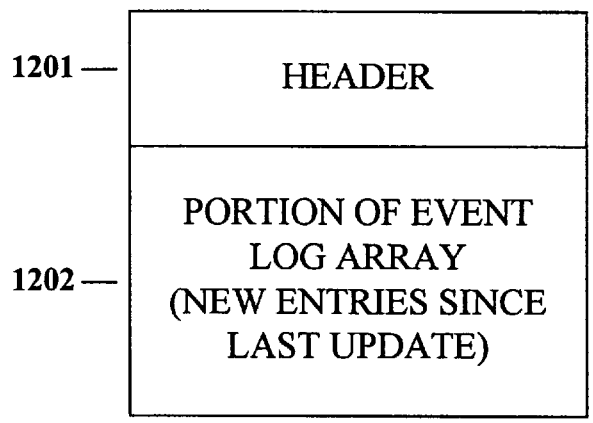
FIG. 11 illustrates the structure of an Event Update Message.

After events have been detected, information about the events is transmitted to the PC for use by the user interface portion. This transmission is facilitated through the use of a message. The structure of an event update message is shown in FIG. 11. The event update message contains a header 1201 and a portion of the event log array 1202. The information sent from the event log array is the event_id 1101, timestamp 1102, byte_length 1103 and parameters 1104 for the entries in the event log array 1202 since the last update sent to the UI.

VI. User Interface

A. Overview

As discussed above, the user interface is the portion of the software implementation of the present invention that is executed by the PC. At the beginning of a network monitoring session, the user selects which network parameters are to be monitored. Each of these parameters, including station-level statistics, network statistics, event information and protocol distribution is discussed in detail above. The User Interface (UI) is capable of displaying any station-level statistic, network statistic, event information, and protocol distribution (discussed above) which the user requests to see and which the protocol analyzer instrument can capture and report to the UI.

Figure 13:
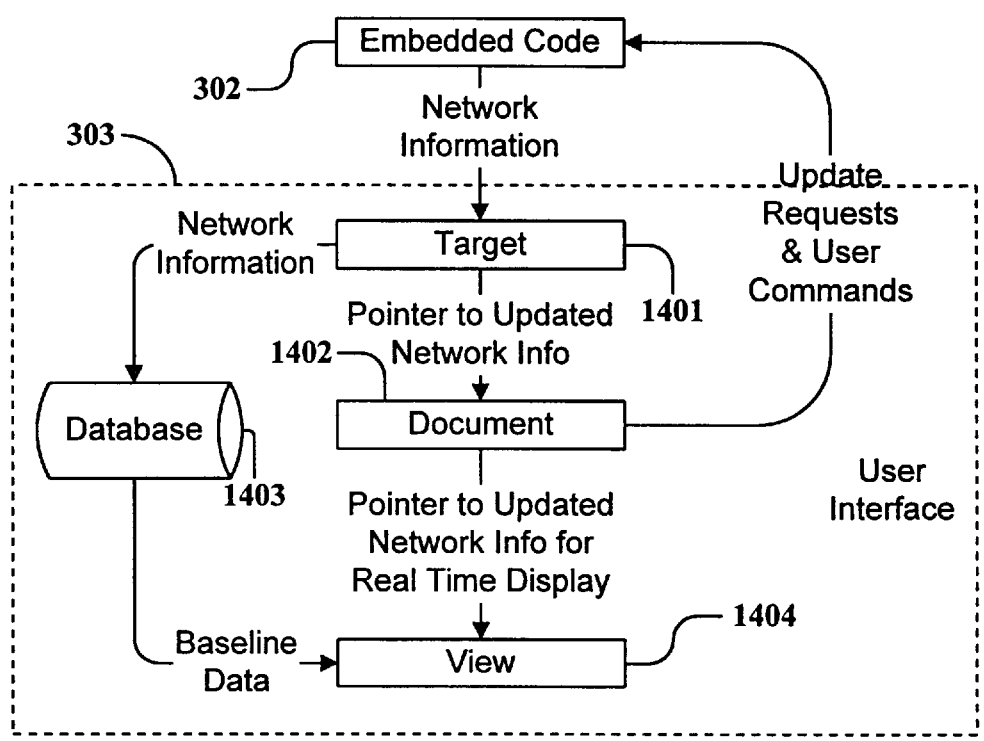
FIG. 13 illustrates the structure of the user interface.

FIG. 13 illustrates the general structure of the user interface (UI). The UI sends request messages to the Embedded Code 302 seeking update information about the various network parameters ("network information").

A message is a preferred method of communication among the various hardware and software components of the present invention. The message contains a header portion which identifies the destination for the message and the type of message (e.g., Network Statistics Request Message, Network Statistics Update Message, etc.). The message also contains the data being transmitted (e.g., the updated network statistics themselves).

The user can select how often network information is updated, i.e. how often the UI requests updates from the embedded code on these parameters. The operation of the UI is largely software controlled using custom software (the design of which is disclosed herein) and also uses off-the-shelf software tools. The custom software is preferably designed using a technique known as "object-oriented programming" which is described in a text entitled *Object Oriented Design with Applications*, by Grady Booch, copyright 1991, from Benjamin Cummings Publishing Co., Inc., Redwood City, Calif., which is incorporated by reference as though fully reproduced herein. Many of the terms used herein, e.g., object, class, scenario diagram, etc., are taken from the Booch text and are well known to programmers familiar with object oriented programming. Another text by Grady Booch, entitled *Object-Oriented Analysis and Design with Applications*, second edition, copyright 1994, is similarly incorporated herein by reference.

The portion of the UI software that is responsible for sending update request messages is referred to as the "Document" 1402 (FIG. 13). The Document 1402 is the portion of the software that is responsible for managing the flow of data for the UI. After a Request Message is sent to the Embedded Code 302, the Embedded Code 302 sends the updated network information to an appropriate software "Target" 1401 via an Update Message. The word "target" refers to a software device that is used to accept data for storage, forwarding, or processing.

There is a software Target 1401 for every network parameter that is monitored. In other words, Network Statistics Update Messages are routed to the Network Statistics Target and Station-level Statistics Update Messages are routed to the Station-Level Statistics Target and so on. The Target 1401 is responsible for receiving updated network information, storing the information in a Database 1403 (discussed in detail below) located on the PC's storage device, and providing the Document 1402 with a pointer to the memory location containing the updated network information.

Views 1404 are the portions of the UI software that are responsible for presenting network information, in the form of charts, tables, tree formats, etc., to the user via the PC's display device, e.g., a color cathode ray tube. There is a View 1404 for each network parameter (i.e. network statistics, protocol distribution, etc.) and each type of presentation method (i.e., charts, tables, tree formats etc.). For example, there is a view entitled Network Statistics Chart View, which presents network statistics in a graphical or chart format. A plurality of views can be used at the same time to present network information to the user in several formats simultaneously.

If the user is viewing network information in real-time (i.e., as the information is being uploaded from the protocol analyzer instrument), the Document 1402 informs the appropriate View 1404 of the receipt of some update from the embedded code 302. The View 1404 then gets from the Document 1402 the pointer to the memory location (in the PC's RAM or random access memory) that contains the updated network information. The View 1404 then presents this information in the appropriate format to the user via the PC's display device.

When the term "real-time" is used in relation to the presentation of network information, the presentation of such information is actually done as updates are received from the embedded code rather than simultaneously with the calculations.

If the user is not viewing "real time" network information but is viewing network information from a database containing network information gathered during a previous network monitoring session (i.e., "baseline data"), the View 1404 gathers relevant information from the Database 1403 and presents the information in the appropriate format to the user via the PC's display device.

Simultaneous display of a plurality of network parameters, either all real time, or all from the database, or mixed is accomplished through the use of well-known features and capability inherent in the Microsoft Windows operating system. Therefore, information on a plurality of network parameters can be displayed simultaneously. Also, nothing has been incorporated into the present invention that limits or disables these well known features and capabilities.

The various Views are programmed to present the network information to the user in the forms of charts, graphs, tables and trees as mentioned above. Off-the-shelf products are used to present the network information to the user.

The product ChartFx (Version 3.0), marketed by Software FX, Inc. at 7100 West Camino Real, Boca Raton, Fla. 33060, is used to display network information in the form of charts and graphs. Network information on station-level statistics, network statistics and protocol distribution in preferably displayed in the form of charts and/or graphs. The User's Manual for ChartFx is hereby incorporated by reference as if fully reproduced herein.

The product SpreadVBX++ (Ver. 2.0), marketed by Far-Point Technologies, Inc. at 133 South Center Court, Suite 1000, Morrisville, N.C. 27560, is used to display network information in the form of tables and spreadsheets. Network information relating to station-level statistics, network statistics and event information is preferably displayed in the form of tables and/or spreadsheets. The User's Manual for SpreadVBX++ is hereby incorporated by reference as if fully reproduced herein.

The product TreeControl (Version 1), marketed by Premia Creative Controls Corp. at 1075 N.W. Murray Blvd., Suite 268, Portland, Oreg. 97229, is used to display protocol distribution in a tree format. The User's Manual for Tree-Control is hereby incorporated by reference as if fully reproduced herein.

In creating the User Interface of the present invention, use was made of the Microsoft Foundation Class (MFC) Library, made by Microsoft Corp., i.e., many terms, including "document" and "view," were taken from the literature relating to that library. The User's Manual for the MFC Library is hereby incorporated by reference as if fully reproduced herein.

B. Database

The preferred embodiment of the present invention utilizes an object-oriented (OO) database application. In the preferred embodiment of the invention, the database application used is the POET database product (Ver. 3.0), marketed by Poet Software Corp. at 999 Baker Way, Suite 100, San Mateo, Calif. 94404. The Reference Manual for POET 3.0 is hereby incorporated by reference as if fully reproduced herein.

POET 3.0 is an OO database application which uses a C++ programming language Application Program Interface (API). Other database applications which use a C++ API would also be appropriate for use in the present invention. The present invention could also utilize ODBC (Open Database Connectivity) database applications if they are used in conjunction with an SQL (Structured Query Language) API.

The primary reason why an object-oriented database as opposed to a standard relational database was selected to implement the present invention is the increased access speed attainable by using an object-oriented database. An object-oriented database such as POET stores C++ objects in a database and allows the programmer to retrieve them using the database operations. The objects read from the database look and act just like the objects stored because an object-oriented database knows how to read C++ class declarations and therefore, manage C++ objects.

In the preferred embodiment of the invention, the database may be saved to a storage device for use as a "baseline" against which future network monitoring sessions may be compared.

C. Station-Level Statistics User Interface

Figure 14:
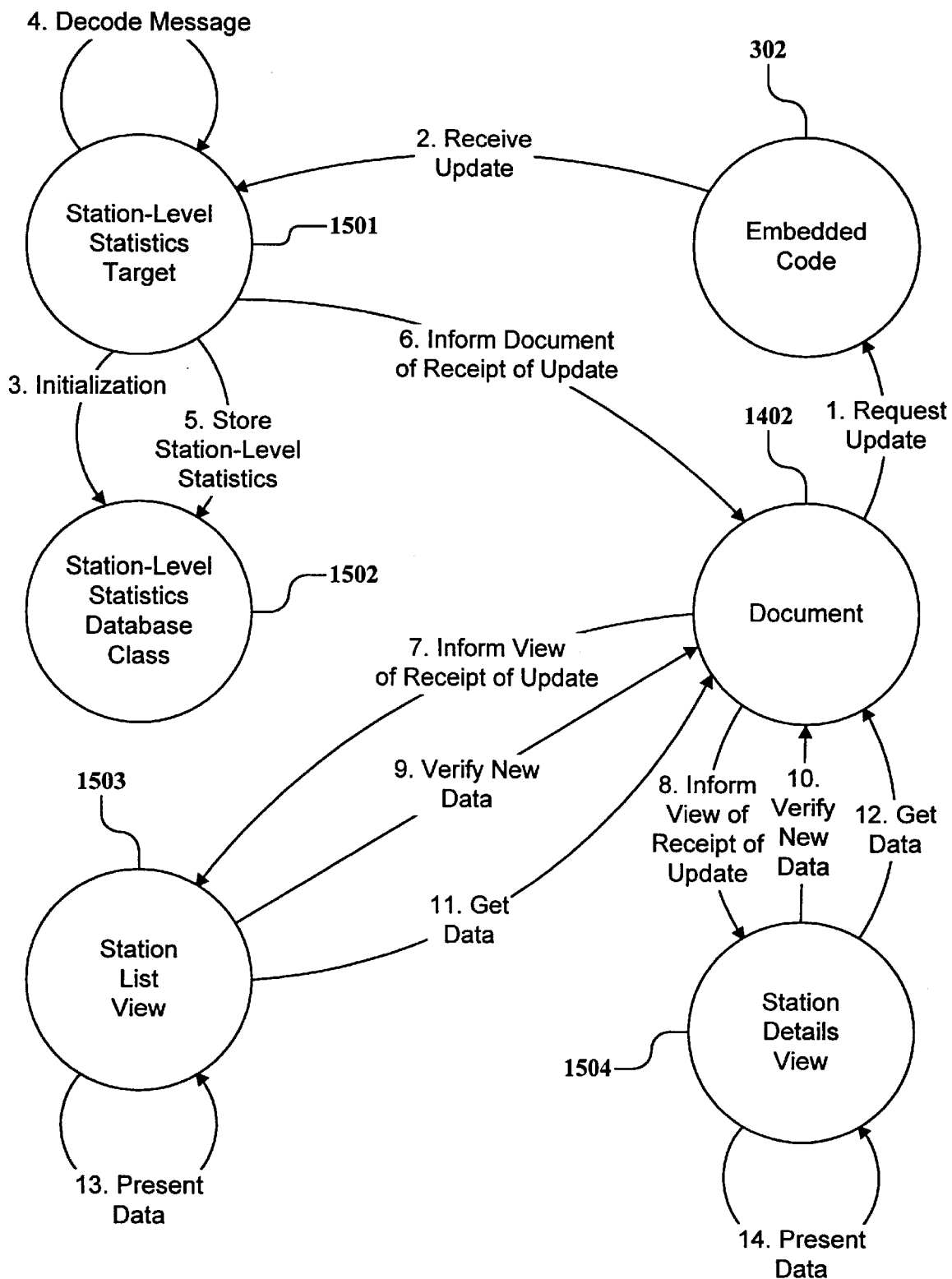
FIG. 14 is a scenario diagram for a station-level statistics update.

FIG. 14 is a "scenario diagram" depicting the process by which station-level statistics are displayed to the user in real time. First, the Document 1402 requests an update of station-level statistics from the Embedded Code 302. Second, the Station-Level Statistics Target 1501 receives the updated station-level statistics (i.e. the station-level statistics update message discussed above under Station-Level Statistics).

In step three, the Station-Level Statistics class 1502 is initialized. By "initialized" is meant that a new instance is created of that POET object of the station-level-statistic type, for storing the new data. The Station-Level Statistics class is a class in the POET database which contains information on station-level statistics.

In step four, the Station-Level Statistics Target 1501 decodes the Station-Level Statistics Update Message. The Station-Level Statistics Target 1501 begins this decoding process by reading the message header and the station list array from the update message. Next, it determines which type of station-level statistics are contained in the update message (i.e., ethernet statistics, token ring statistics, FDDI statistics, frame relay statistics, etc.). Finally, the Station-Level Statistics Target 1501 places each of the station-level statistics obtained from the decoded update message in a POET data object for storage and later access.

If the user has selected to store information on station-level statistics to a database on the PC's storage device for later use as a baseline, this information is stored in the appropriate location in the POET database in step five.

In step six, the Station-Level Statistics Target 1501 informs the Document 1402 that the Target 1501 has received some kind of an update. A pointer to the POET data objects containing the updated station-level statistics is sent from the Target 1501 to the Document 1402. A pointer is an address which identifies or "points to" the memory location in RAM that contains the data.

In steps seven and eight, the Document 1402 informs the Station List View 1503 and the Station Details View 1504 that the views may have to be updated. That is, the Document 1402 informs the Views 1503 and 1504 that some new data has been received but not the exact type and content of the new data. The Station List View 1503 controls the display of a listing of MAC addresses and other information about activity at those MAC address stations. The Station Details View 1504 controls the display of sortings and other detailing of the stations to highlight such factors as which stations are transmitting the most frames, which are receiving the most frames, which are involved with the most error messages, etc. The scope and nature of the details displayed is arbitrary to the user.

In steps nine and ten, the Station List View 1503 and the Station Details View 1504 request verification from the Document 1402 that there is new data which should, in fact, be added to the Station List View 1503 and Details View 1504. This step is useful because the user has initially selected how often information on station-level statistics was to be updated, and it is possible that there was no new station-level statistic information between the last update and the present update. In this case, there are no new data to be added to the views.

If the Document 1402 responds that there are indeed new data, i.e. there is new information in the station-level statistics array, then these new data are obtained by the views in steps eleven and twelve. The Station List View 1503 and the Station Details View 1504 receive a pointer or address to the location in the random-access memory (RAM) of the PC that contains the new data from the Document 1402. The views then obtain the object containing the new data or information.

Steps thirteen and fourteen involve presenting all of the updated station-level statistics to the user in the form of tables and charts. At this point, the views use the pointers passed to them to gather the new data from its memory location for presentation in the appropriate format. The Station List View 1503 is responsible for displaying the data in the form of a table. This is accomplished through the off-the-shelf product SpreadVBX++, discussed above under User Interface—Overview. The Station List View 1503 is capable of presenting station-level statistics to the user in a sorted order based upon the value of any of the individual statistics. The Station Details View 1504 is responsible for displaying station-level statistics in the form of piecharts indicating top transmitting, receiving, and error producing stations. This is accomplished through use of the off-the-shelf product ChartFx, discussed above under User Interface—Overview.

Figure 18:
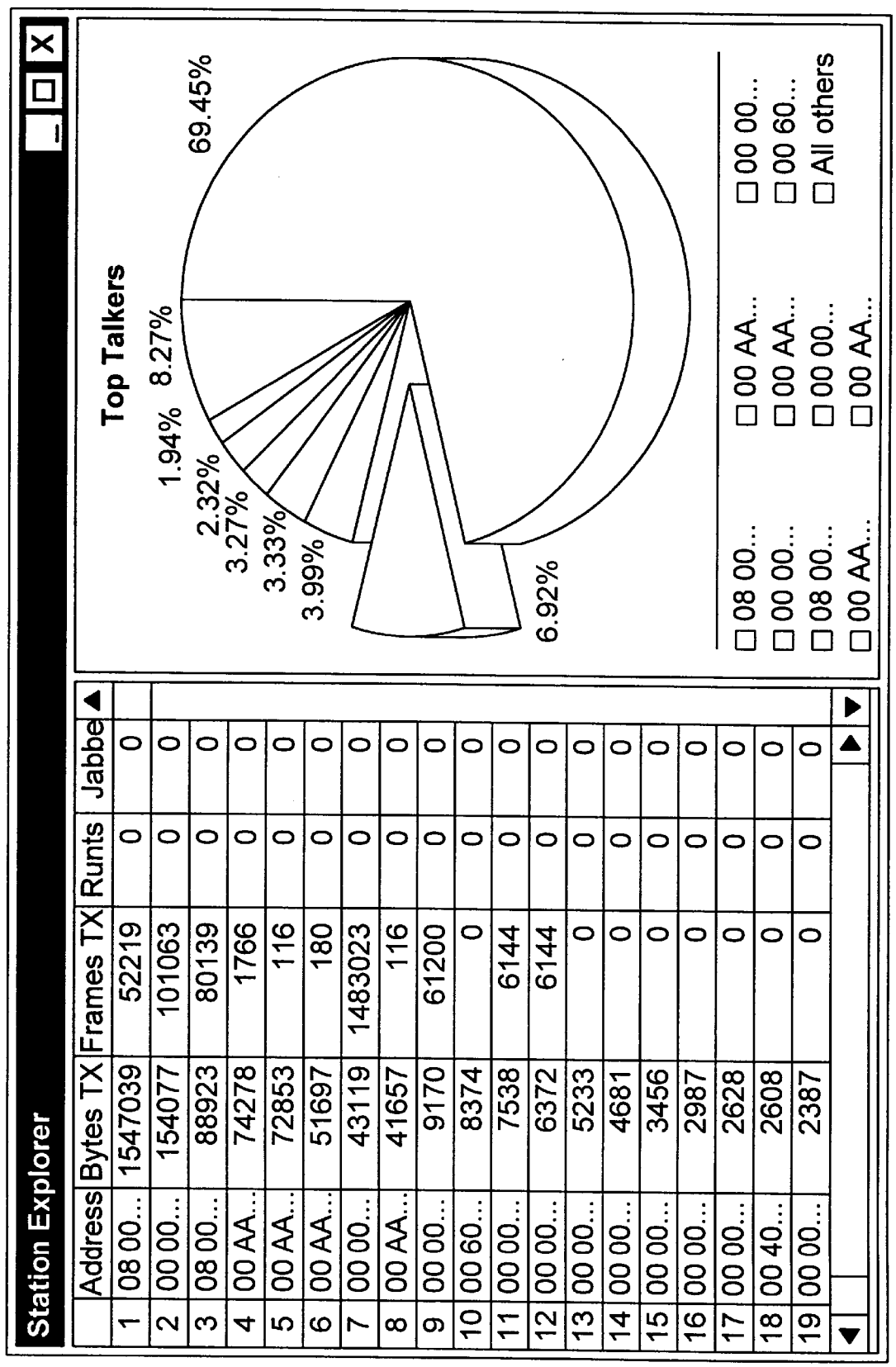
FIG. 18 illustrates the visual appearance of an example of a split-screen display of station-level statistics.

FIG. 18 illustrates an example of a display screen arrangement for displaying station statistics to the user. The list can show "top talkers" and "top listeners" as well as a host of other catagories of information, the desirability and usefulness of which will be readily evident to a person having ordinary skill in the art of digital network transmission analyzers. A split-screen display is also available with Microsoft Windows to show that the desired statistics can be shown in any number of formats, including the pie chart illustrated in FIG. 18.

D. Network Statistics User Interface

Figure 15:
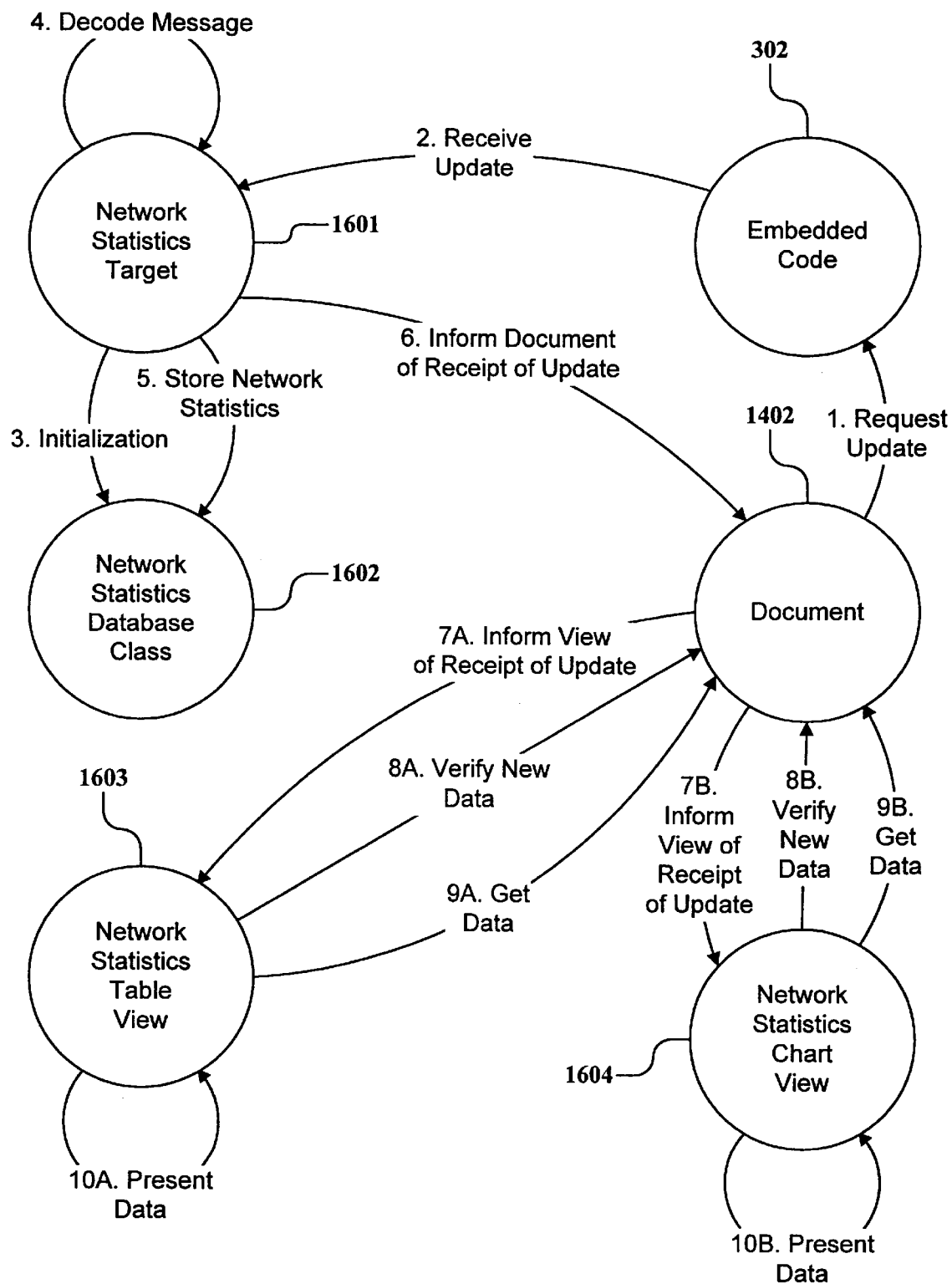
FIG. 15 is a scenario diagram for a network statistics update.

FIG. 15 is a scenario diagram depicting the process by which information on network statistics is displayed to the user in real time. First the Document 1402 requests an update of network statistics from the Embedded Code 302. Second, the Network Statistics Target 1601 receives the updated network statistics (i.e. the Network Statistics Update Message discussed above under Network Statistics).

In step three, the Network Statistics class 1602 is initialized. The Network Statistics class is a class in the POET database which contains information on network statistics. One instance of the Network Statistics class is Ethernet Network Statistics which contains network statistic information particular to an Ethernet network.

In step four, the Network Statistics Target 1601 decodes the Network Statistic Update Message. The Network Statistics Target 1601 begins this decoding process by reading the Header 1301 and the Network Statistics Array 1302 from the update message. Next, the Network Statistics Target 1601 determines which type of network statistics are contained in the update message (i.e., ethernet statistics, token ring statistics, FDDI statistics, frame relay statistics, etc.). Finally, the Network Statistics Target 1601 places each of the network statistics obtained from the decoded update message in a POET data object for storage and later access.

If the user has selected to store information on network statistics to a database on the PC's storage device for later use as a baseline, this information is stored in the appropriate location in the POET database in step five. The appropriate storage location in the POET database is based upon the relevant class (i.e., Ethernet Network Statistics, Token Ring Network Statistics, etc.).

In step six, the Network Statistics Target 1601 informs the Document 1402 that the Target 1601 has received an update. A pointer to the data objects containing the updated network statistics is sent from the Target 1601 to the Document 1402.

In step seven, the Document 1402 informs the Network Statistics Table View 1603 and/or the Network Statistics Chart View 1604 (depending on which view(s) the user is using) that the views may have to be updated.

In step eight, the Network Statistics Table View 1603 and/or Network Statistics Chart View 1604 request verification from the Document 1402 that there is, in fact, new data which should be added to the chart and/or table views. This step is useful because the user has selected how often information on network statistics was to be updated, and it is possible that there was no new network statistic information between the last update and the present update. In this case, there are no new data to be added to the charts and/or tables.

If the Document 1402 responds that there are indeed new data, i.e. there is new information in the network statistics array, then these new data are obtained in step nine. The Network Statistics Table View 1603 and/or the Network Statistics Chart View 1604 receive a pointer to the new data from the Document 1402.

Step ten involves presenting all of the updated network statistics to the user in the form of tables and charts. At this point, the views use the pointers passed to them to gather the new data from their RAM memory location for presentation in the appropriate format. The Network Statistics Table View 1603 is responsible for displaying the data in the form of tables, and this is accomplished through the off-the-shelf product SpreadVBX++, discussed above under User Interface—Overview. The Network Statistics Chart View 1604 is responsible for displaying network statistics in the form of charts and graphs, and this is accomplished through use of the off-the-shelf product ChartFx, discussed above under User Interface—Overview.

Figure 19A:
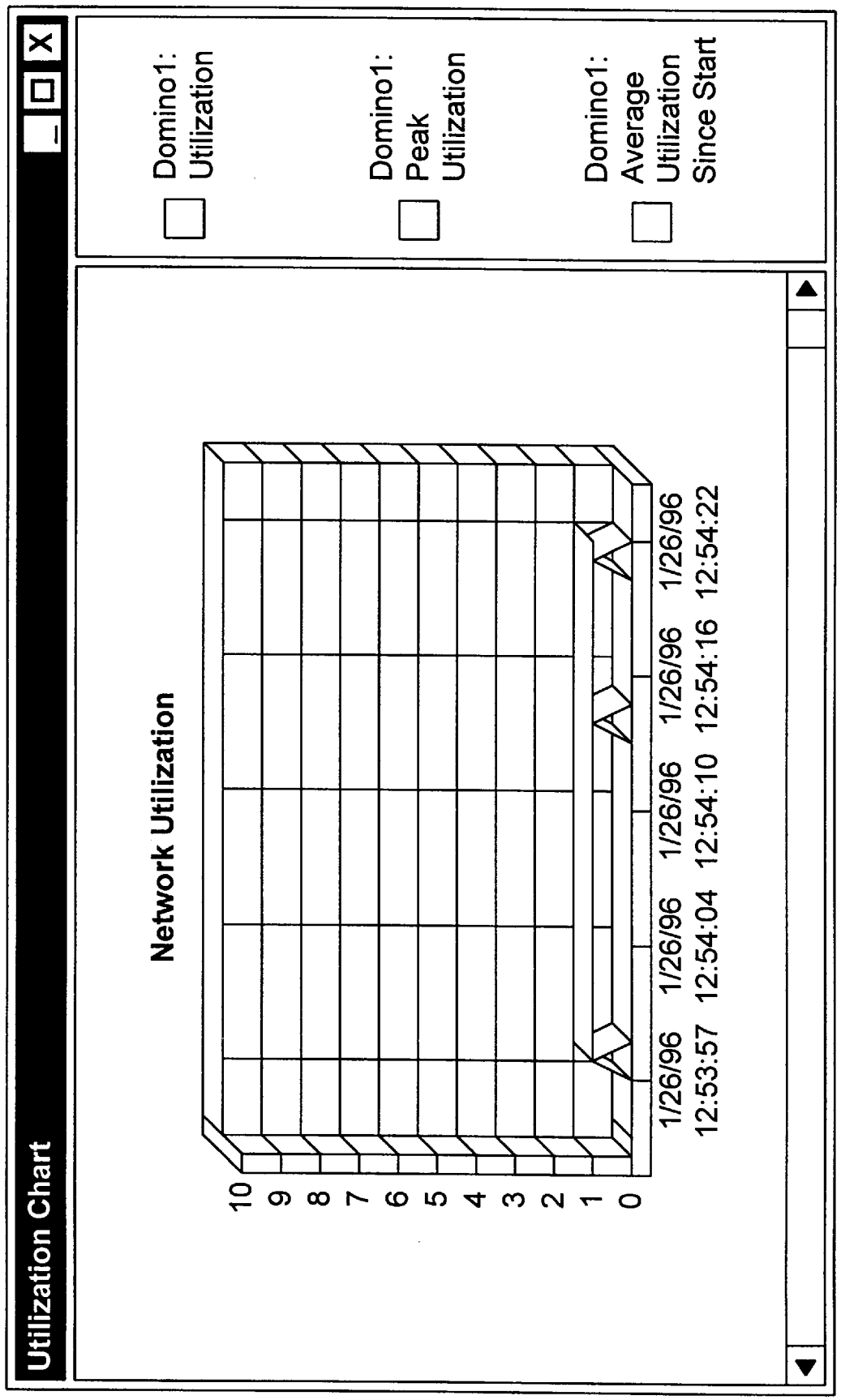
FIGS. 19A, 19B, and 19C illustrate three examples of the appearance of chart display formats for network statistics.
Figure 19B:
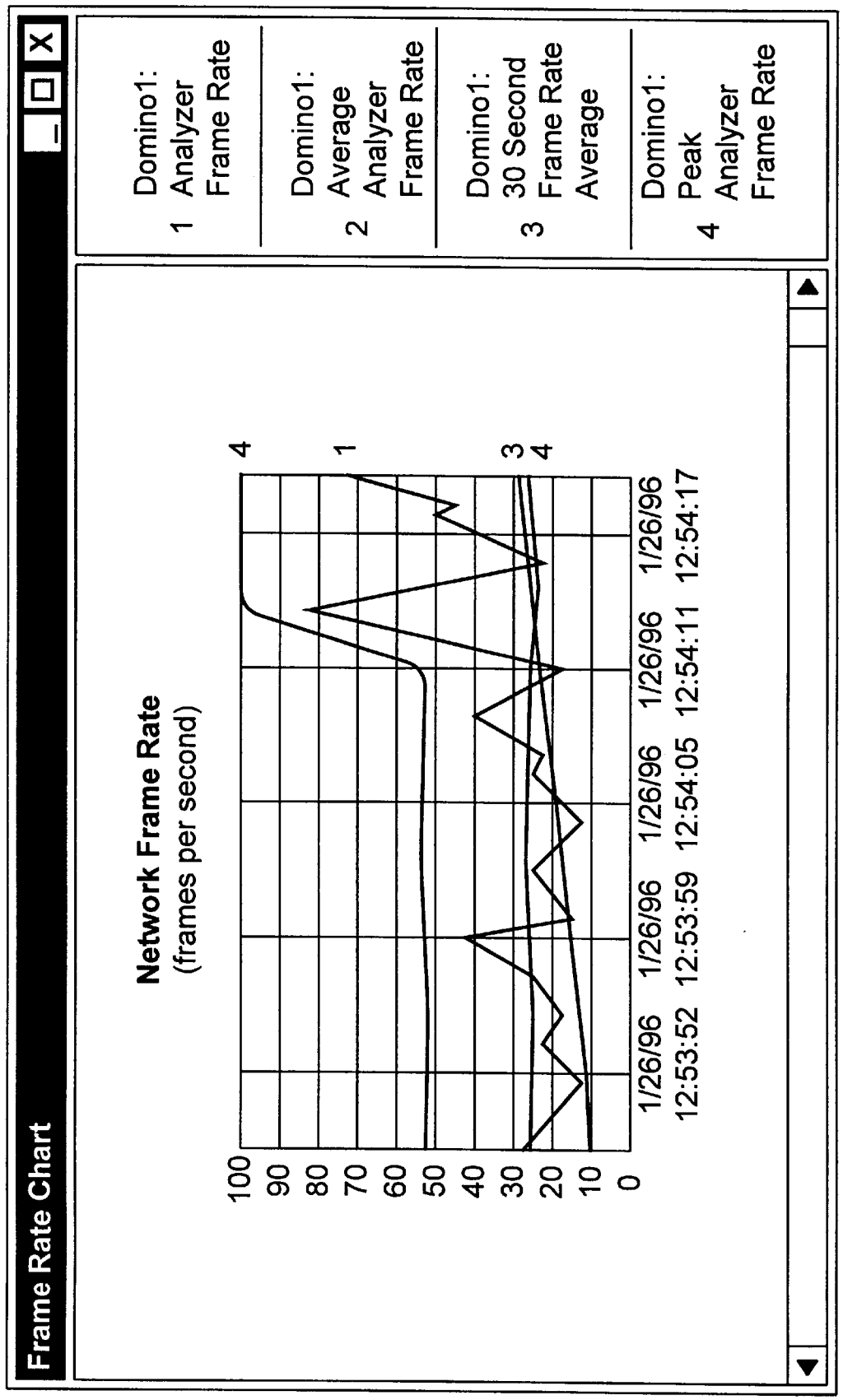
Figure 19C:
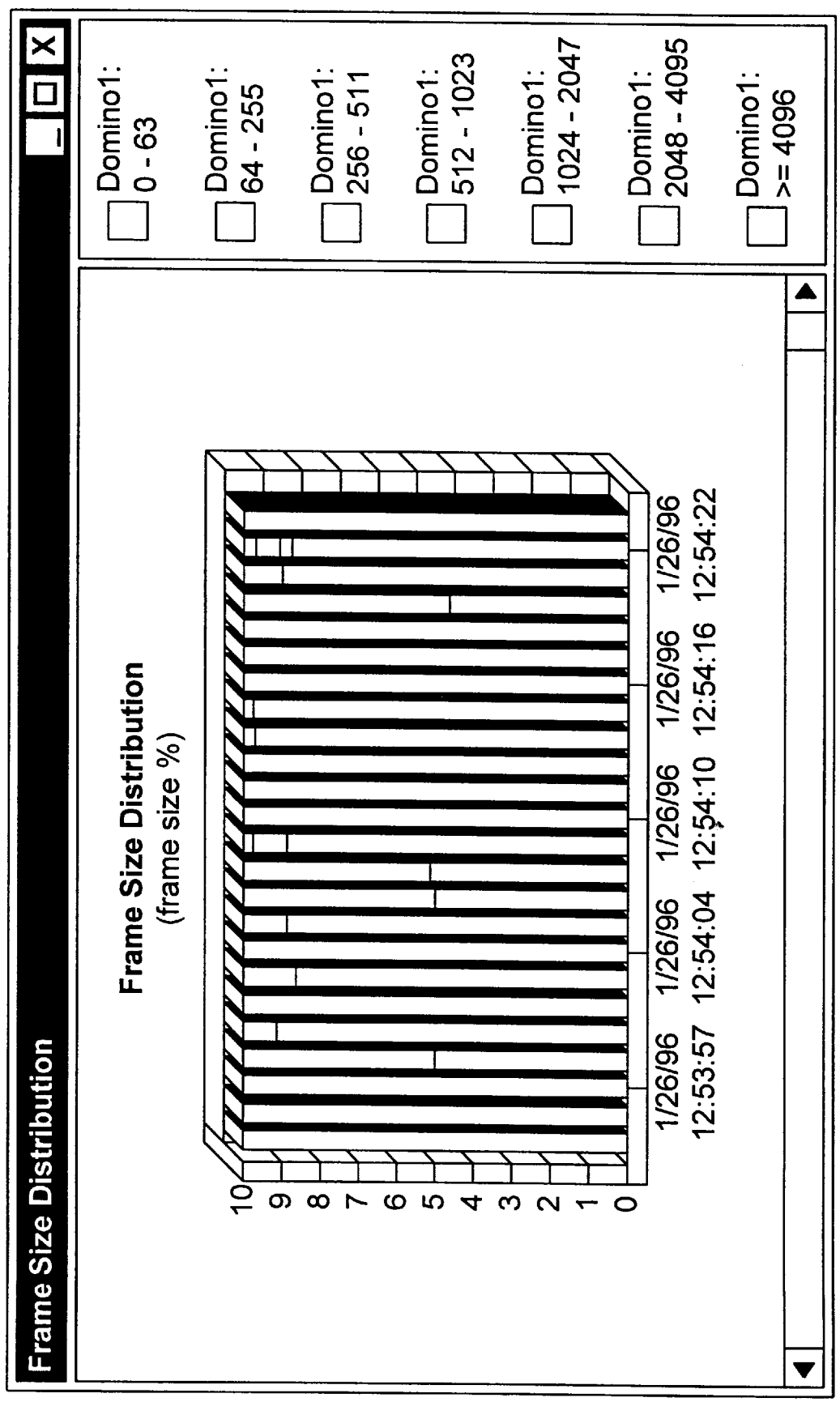

FIGS. 19A, 19B and 19C illustrate three examples of display screen display formats useful for showing network statistics to the user. FIG. 19A illustrates how a network utilization chart might look. FIG. 19B illustrates how a network frame rate chart might look, and FIG. 19C illustrates how a frame size distribution chart might look. While charts are shown, a person having ordinary skill in the programming art, and a person having ordinary skill in the digital network transmission art will be the aware that may other other formats of display can readily be substituted for charts.

E. Protocol Distribution User Interface

Figure 16:
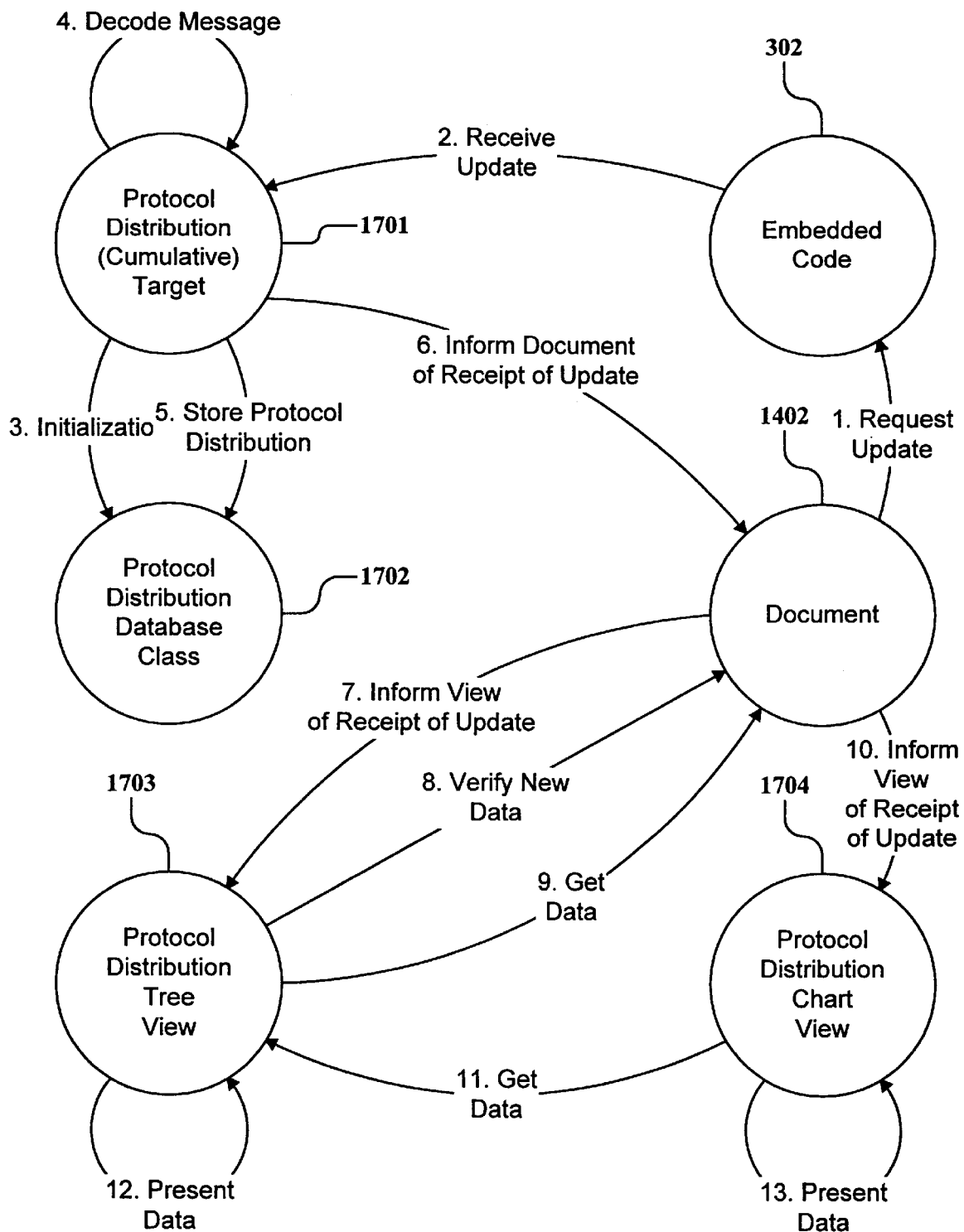
FIG. 16 is a scenario diagram for a protocol distribution update.

FIG. 16 is a scenario diagram depicting the process by which cumulative protocol distribution information is displayed to the user in real time. The process by which protocol distribution that is calculated per sampling period is displayed to the user is analogous to this process.

First the Document 1402 requests an update of protocol distribution from the Embedded Code 302. Second, the Protocol Distribution (Cumulative) Target 1701 receives the updated protocol distribution information (i.e. the Protocol Distribution Update Message discussed above under Protocol Distribution).

In step three, the Protocol Distribution class is initialized. The Protocol Distribution class 1702 is a class in the POET database which contains information on protocol distribution. Instances of the Protocol Distribution class include Protocol Distribution (Cumulative), which contains protocol distribution information on a cumulative basis, i.e. since the network monitoring session began, and Protocol Distribution (Sample), which contains information on protocol distribution for the user-defined sampling period.

In step four, the Protocol Distribution (Cumulative) Target 1701 decodes the Protocol Distribution Update Message. The Protocol Distribution (Cumulative) Target 1701 begins this decoding process by reading the Header 601 (FIG. 6) of the "message" and Protocol Distribution Array information or data array or portion 602 of the message, that was taken from the Protocol Distribution Array of the memory of the protocol analyzer instrument.

As discussed above under Protocol Distribution, each entry in the Protocol Distribution Array data 602 portion of the message contains the protocol_id, statistics_for_the_ protocol, number_of_children, and a children_table. By iteratively examining the contents of each entry in the Protocol Distribution Array 602 portion of the message and cross-referencing the entry with prior entries, the Protocol Distribution (Cumulative) Target 1701 builds a hierarchical protocol distribution structure (tree structure). If the user has chosen to view protocol distribution in a percentage format, the appropriate statistics_for_the_protocol are converted to a percentage (i.e., the total number of bytes received for the protocol is divided by the total number of bytes received and then multiplied by one hundred). Finally, the Protocol Distribution (Cumulative) Target 1701 places each element of the newly created hierarchical protocol distribution structure in a POET data object for later storage and access.

If the user has selected to store protocol distribution information in a database on the PC's storage device for later use as a baseline, this information is stored in the appropriate location in the POET database (i.e., Protocol Distribution (Cumulative)) in step five.

In step six, the Protocol Distribution (Cumulative) Target 1701 informs the Document 1402 that the Target 1701 has received an update. A pointer to the location, in the PC's RAM memory, of the POET data objects that contain the updated hierarchical protocol distribution structure is sent from the Target 1701 to the Document 1402.

In step seven, the Document 1402 informs the Protocol Distribution Tree View 1703 that the view should perhaps be updated.

In step eight, the Protocol Distribution Tree View 1703 requests verification from the Document 1402 that there is new data which should be added to the tree-type display of protocol distribution. This step is used because the user selected how often information on protocol distribution was updated. It is possible that, while there were some new data received, there may have been no new protocol distribution information contained in the new data received from the time of the last update and the present update. In this case, there are no new data to be added to the tree.

If the Document 1402 responds that there are indeed new protocol distribution data, i.e. there is new information in the protocol distribution array, then these new data are obtained in step nine. The Protocol Distribution Tree View 1703 receives a pointer to the new data (in RAM) from the Document 1402.

In step ten, the Document 1402 informs the Protocol Distribution Chart View 1704 that the view should be updated. In step eleven, the Protocol Distribution Chart View 1704 receives a pointer to the new data from the Protocol Distribution Tree View 1703.

Steps twelve and thirteen involve presenting the data to the user in a tree format and a chart format. At this point, the views use the pointers passed to them to gather the new data from its memory location in the RAM of the PC for presentation in the appropriate format. The Protocol Distribution Tree View 1703 is responsible for displaying the data in a tree format. It builds a tree structure based upon the hierarchical protocol distribution structure. An off-the-shelf product entitled TreeControl (discussed above under User Interface—Overview) is used to display the tree structure. The Protocol Distribution Chart View 1704 is responsible for displaying protocol distribution in a pie-chart format. This is accomplished through use of the off-the-shelf product ChartFx, discussed above under User Interface—Overview.

Figure 20:
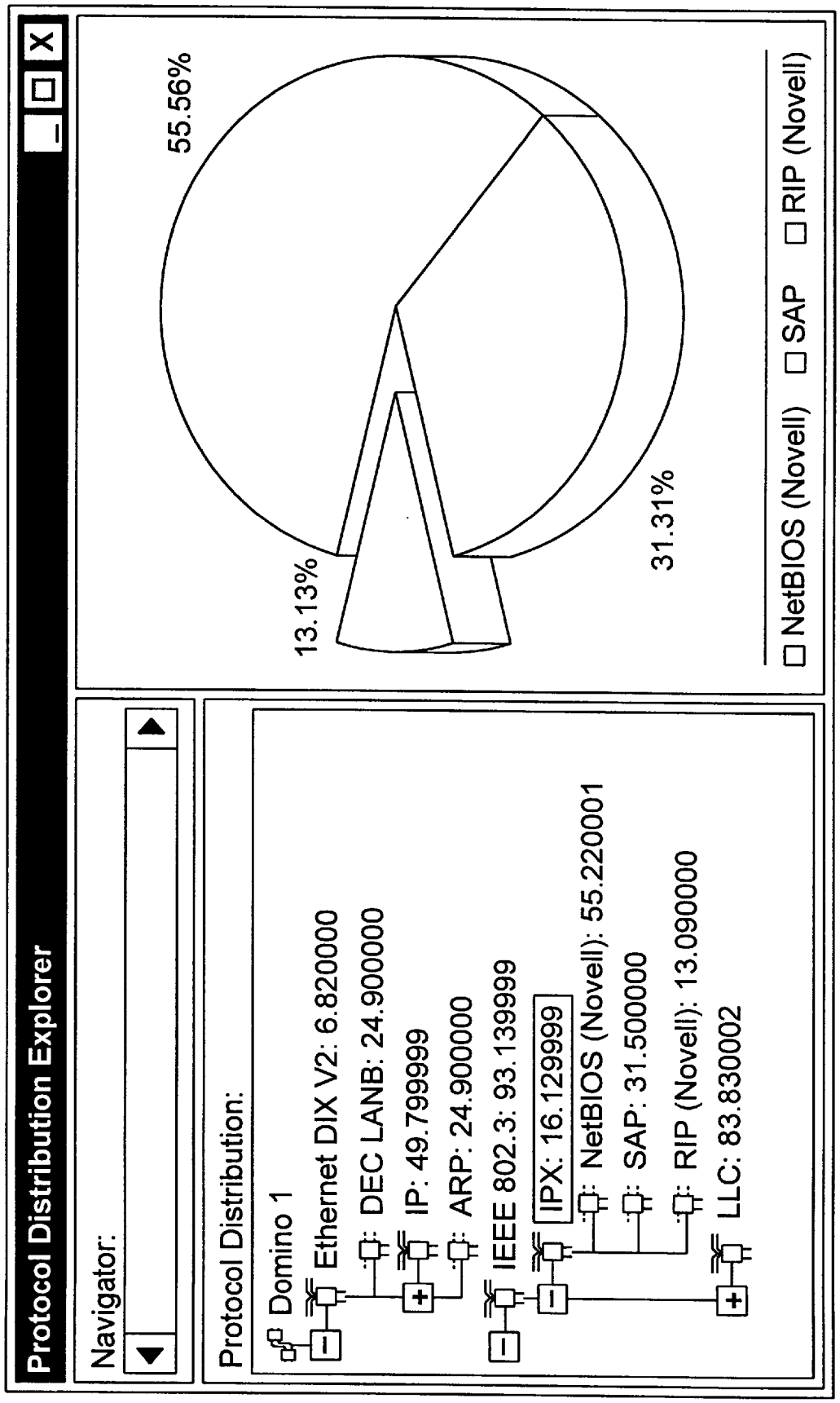
FIG. 20 illustrates an example of the appearance of a split-screen display of protocol distribution.

FIG. 20 illustrates how a split-screen display can be used to highlight one ISO protocol layer, instantly revealing usage by the protocols detected on the network.

F. Event Information User Interface

Figure 17:
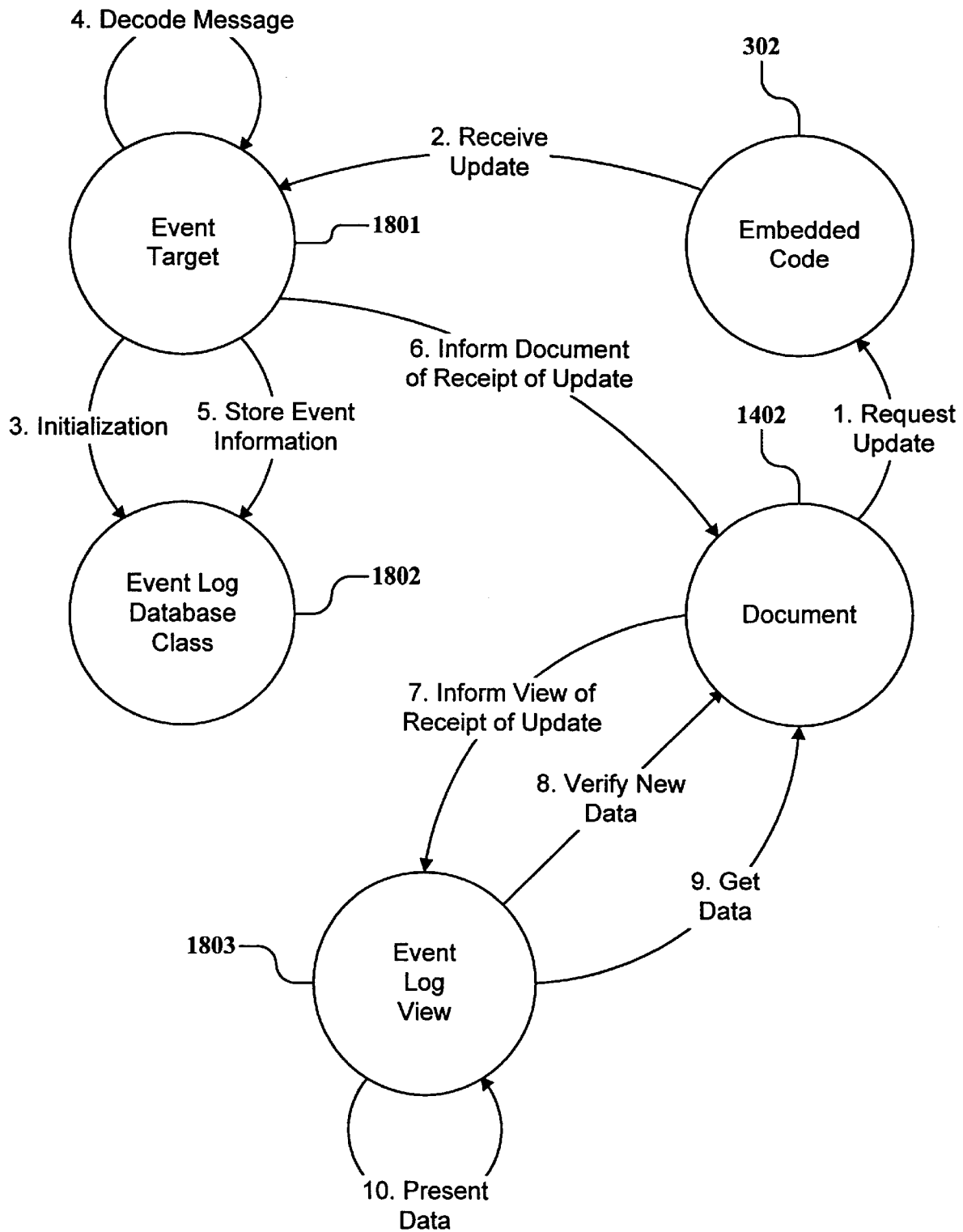
FIG. 17 is a scenario diagram for an event update.

FIG. 17 is a scenario diagram depicting the process by which event information is displayed to the user in real time. First the Document 1402 requests an update of event information from the Embedded Code 302. Second, the Event Target 1801 receives the updated event information (i.e. the event update message discussed above under Event Information).

In step three, the Event Log database class 1802 is initialized. The Event Log class is a class in the POET database which contains event information.

In step four, the Event Target 1801 decodes the Event Update Message. The Event Target 1801 begins this decoding process by reading the message header and the portion of the event log array. It then places information relating to each event, as contained in the portion of the event log array of the memory of the protocol analyzer instrument into a POET data object in RAM storage of the PC for later storage and access.

If the user has selected to store event information in a database on the PC's storage device for later use as a baseline, the information is stored in the appropriate location in the POET database in step five.

In step six, the Event Target 1801 informs the Document 1402 that the Target 1801 has received an update. A pointer to the POET data objects containing the updated event information is sent from the Target 1801 to the Document 1402.

In step seven, the Document 1402 informs the Event Log View 1803 that the view should perhaps be updated. In step eight, the Event Log View 1803 requests verification from the Document 1402 that there is, in fact, new data which should be added to the Event Log View. This step is useful because the user had selected how often event information was updated, and it is possible that there was no new event information from the time of the last update to the time of the present update. In this case, there are no new data to be added to the view.

If the Document 1402 responds that there is indeed new data, i.e. there is new information in the event log array in the memory of the PC, then these new data are obtained by the Event Log View 1803 in step nine. The Event Log View 1803 receives from the Document 1402, a pointer to the new data now stored in the PC's RAM.

Step ten involves presenting all of the updated event information to the user in a table format. At this point, the event log view uses the pointer passed to it to gather the new event information from its memory location in the PC's RAM for presentation in the appropriate format. For each event, the Event Log View 1803 presents the name of the event (derived from the event_id), the time of the event, and a brief description of the event (derived from the event parameters) in the form of a table. Presentation of event information in a table format is accomplished through the off-the-shelf product SpreadVBX++, discussed above under User Interface—Overview.

FIG. 21 illustrates a preferred example of how detected events can be sorted and displayed with timestamps, on the PC's display device so as to enhance the user's ability to find information quickly.

G. Hypertext Troubleshooting Information

The user interface is also capable of displaying detailed information about a particular event and the possible causes of the event in a hypertext format. Hypertext in conjunction with the present invention allows a user to access detailed explanations through use of the PC's pointing device. The user can obtain detailed definitions of statistics and events as well as possible causes of each type of event by double-clicking the PC's pointing device on the event or statistic displayed by the user interface. A "window" is opened on a display containing a detailed definition of the event or statistic as well as a brief discussion of the possible causes and ramifications of the event. This information is contained in a standard Microsoft Windows context-sensitive help file format.

In addition to specific information relating to events and statistics, the user interface is also capable of displaying step-by-step troubleshooting information in a hypertext format which assists the user in solving problems on a network by posing increasingly specific queries until a solution is reached. This information is likewise contained in a standard Microsoft Windows help file format. The exact method by which the above data are displayed would be readily apparent to a person having ordinary skill in the art of software programming and in the art of network analyzing. The text of the troubleshooting information can be created and written specifically for the UI by a person having ordinary skill in the digital data transmission art; or troubleshooting information for Ethernet and Token Ring networks can be examined in a textbook entitled *Ethernet and Token Ring Optimization*, by Daniel J. Nassar, Copyright 1996, Henry Holt & Co., Inc., New York, N.Y., which is hereby incorporated by reference as though fully reproduced herein.

H. Reports

As discussed above, transmission information concerning Protocol Distribution, Station-Level Statistics, Network Statistics and Events are displayed for the user in the form of graphs and charts. The transmission information can also be used to create customized presentation-quality reports. These customized reports provide the transmission information in a presentation quality format. The invention also allows the user to specify the time span which the report will cover.

Reports may be printed on a standard printer connected to the PC or displayed on the PC's display device. Reports also may be previewed and modified on-line prior to printing. The reporting feature is implemented using an off-the-shelf reporting application entitled ReportFX (Ver. 1.0), marketed by Software FX, Inc. at 7100 West Camino Real, Boca Raton, Fla. 33060. The User's Manual for ReportFx is hereby incorporated by reference as if fully reproduced herein.

I. Analysis of Captured Frames

The present invention is also capable of saving the contents of the capture buffer to a capture file on a storage device (see Frame Analysis above for discussion of capture buffer). The present invention can then display information about specific frames stored in the capture file. The user interface allows the user to examine a captured frame, search the capture file for filter criteria, view the protocols present in a frame, specific frames, view only those frames which meet specific and print the contents of the frame on a printer attached to the PC. Analysis of captured frames is accomplished by use of a software application entitled Examine which is marketed by Wandel & Goltermann Technologies, Inc. at 1030 Swabia Court, Research Triangle Park, N.C. 27709-3585.

J. Use of Analysis

If an event is noted, depending upon the nature of the event noted, the data portion of the message conveying that event information to the PC will include any MAC addresses that were involved in that event. The user can request reporting or displaying of any combination of further information about that MAC address that might be pertinent to that event.

For example, if a high level of network utilization is noted, the transmitting stations and receiving stations can be displayed as sorted according to the number of messages transmitted or received. This will immediately disclose which stations are transmitting the most (top talkers)and which stations are receiving the most (top listeners).

The station statistics for the top talker or top listener can then be queried by protocol used. If a large number of the frames for a station carry the IP (internet protocol), it could mean that the employee using that station is either gathering a lot of needed project information from the internet or that the employee is "surfing" the internet on company time. Therefore, some supervisory involvement may be in order to ascertain if that employee should be switched to a more lightly-loaded network or should be admonished about wasting company time.

VII. Conclusion

While the protocol analyzer herein described constitutes the preferred embodiment of the present invention, it is to be understood that the invention is not limited to this precise form of apparatus and that changes may be made therein without departing from the scope of the invention which is defined in the appended claims.

We claim:

1. A protocol analyzer for calculating and displaying protocol distribution in real-time in connection with monitoring data frames carried on a digital transmission network, comprising:

means for monitoring the transmission, over the digital transmission network, of frames containing data and protocols;

means for identifying the protocols within the frames and for identifying the encapsulation of the protocols within the frames:

means for storing the identity and encapsulation of the protocols within the frames:

means for calculating the protocol distribution of the frames; and means for displaying in real-time the protocol distribution of the frames in a hierarchical tree format based upon the encapsulation of the protocols within the frames, said means comprising:

a first processing instrumentality, comprising means for periodically requesting a protocol distribution update message containing encoded updated protocol distribution information from said means for calculating the protocol distribution of the frames;

a second processing instrumentality, having:

a. means for receiving and decoding the protocol distribution update message to obtain the updated protocol distribution information, and b. means for providing said first processing instrumentality with a pointer to the updated protocol distribution information;

a display device for displaying the updated protocol distribution information; and a third processing instrumentality, having:

a. means for obtaining a pointer to the updated protocol distribution information from said first processing instrumentality, and b. means for sending the updated protocol distribution information to said display device in a hierarchical tree format based upon the encapsulation of the protocols within the frames.

* * * * *